US007991186B2

(12) United States Patent
Rudaz et al.

(10) Patent No.: US 7,991,186 B2
(45) Date of Patent: Aug. 2, 2011

(54) BANKNOTES WITH A PRINTED SECURITY IMAGE THAT CAN BE DETECTED WITH ONE-DIMENSIONAL SIGNAL PROCESSING

(75) Inventors: Nicolas Rudaz, Veyras (CH); Martin Kutter, Remaufens (CH); Fred Jordan, Les Paccots (CH); Jean-Claude Gilles, Frankfurt am Main (DE); Pierre Durant, Frankfurt am Main (DE)

(73) Assignee: European Central Bank, Frankfurt am Main (DE)

( * ) Notice: Subject to any disclaimer, the term of this patent is extended or adjusted under 35 U.S.C. 154(b) by 1015 days.

(21) Appl. No.: 11/816,235

(22) PCT Filed: Oct. 12, 2005

(86) PCT No.: PCT/EP2005/055204
§ 371 (c)(1),
(2), (4) Date: Aug. 14, 2007

(87) PCT Pub. No.: WO2006/048368
PCT Pub. Date: May 11, 2006

(65) Prior Publication Data
US 2008/0159615 A1    Jul. 3, 2008

(30) Foreign Application Priority Data

Feb. 15, 2005    (EP) ..................................... 05101116

(51) Int. Cl.
*G06K 9/00*    (2006.01)
(52) U.S. Cl. ...................................................... 382/100
(58) Field of Classification Search .................. 382/100, 382/135, 137–140; 713/176; 209/534; 283/113; 356/71; 358/3.28, 3.3; 902/7; 705/45
See application file for complete search history.

(56) References Cited

U.S. PATENT DOCUMENTS

| 5,018,767 | A | * | 5/1991 | Wicker | ........................... 283/67 |
| 5,530,772 | A | * | 6/1996 | Storey  | ........................... 382/135 |

(Continued)

FOREIGN PATENT DOCUMENTS

| AU | 2003246012 | 4/2004 |
| CH | 694233 | 9/2004 |
| EP | 1073257 | 1/2001 |
| WO | WO 0100560 | 1/2001 |
| WO | WO 03004178 | 1/2003 |
| WO | WO 2004051917 | 6/2004 |

OTHER PUBLICATIONS

Solachidis et al. ("Self-similar ring shaped watermark embedding in 2-D DFT domain", Department of Informatics, Aristotle University of Thessalaoniki, Greece, Sep. 2000).*

(Continued)

*Primary Examiner* — Jason M Repko
*Assistant Examiner* — Shervin Nakhjavan
(74) *Attorney, Agent, or Firm* — DLA Piper LLP

(57) ABSTRACT

A method to generate a security pattern to be embedded in an original image has the particularity that the detection of the security pattern can be achieved through a simple, low processing capability device. The method for generating a security image comprising the original image and the security pattern is characterized in that the security pattern is formed by an inverse transform of the combination in the frequency domain of an auxiliary image and a radially symmetric, two-dimensional pattern, said two-dimensional pattern created by sweeping a self-similar, one-dimensional function along a 360-degree arc, and the security image is generated by the modulation of at least one color of at least a part of the original image with the pattern.

22 Claims, 30 Drawing Sheets

U.S. PATENT DOCUMENTS

| | | | |
|---|---|---|---|
| 5,995,638 A | 11/1999 | Amidror et al. | |
| 6,104,812 A * | 8/2000 | Koltai et al. | 380/51 |
| 6,198,545 B1 | 3/2001 | Ostromoukhov et al. | |
| 6,345,104 B1 * | 2/2002 | Rhoads | 382/100 |
| 6,408,082 B1 | 6/2002 | Rhoads et al. | |
| 6,424,725 B1 | 7/2002 | Rhoads et al. | |
| 6,449,377 B1 | 9/2002 | Rhoads | |
| 6,567,534 B1 | 5/2003 | Rhoads | |
| 6,674,886 B2 | 1/2004 | Davis et al. | |
| 6,694,041 B1 | 2/2004 | Brunk | |
| 6,704,869 B2 | 3/2004 | Rhoads et al. | |
| 6,723,121 B1 | 4/2004 | Zhong | |
| 6,754,377 B2 | 6/2004 | Rhoads | |
| 6,760,464 B2 * | 7/2004 | Brunk | 382/100 |
| 6,771,796 B2 | 8/2004 | Rhoads | |
| 6,775,394 B2 | 8/2004 | Yu | |
| 6,839,450 B2 | 1/2005 | Yen et al. | |
| 7,751,608 B2 * | 7/2010 | Hersch et al. | 382/135 |
| 2003/0012402 A1 | 1/2003 | Ono | |
| 2003/0021437 A1 | 1/2003 | Hersch et al. | |
| 2003/0031340 A1 | 2/2003 | Alattar et al. | |
| 2003/0035565 A1 | 2/2003 | Rhoads | |
| 2003/0076540 A1 * | 4/2003 | Hamashima et al. | 358/3.28 |
| 2004/0001604 A1 * | 1/2004 | Amidror | 382/100 |
| 2004/0013285 A1 | 1/2004 | Jordan et al. | |
| 2004/0076310 A1 * | 4/2004 | Hersch et al. | 382/100 |
| 2004/0084893 A1 * | 5/2004 | Fan et al. | 283/72 |
| 2004/0086197 A1 | 5/2004 | Fletcher et al. | |
| 2004/0218222 A1 * | 11/2004 | Damera-Venkata | 358/3.13 |
| 2004/0264736 A1 * | 12/2004 | Parisis et al. | 382/100 |
| 2005/0123169 A1 | 6/2005 | Wendt | |

OTHER PUBLICATIONS

Lin et al. ("Rotation, Scale and Translation Resilient Watermarking for Images", IEEE Transaction on Image Processing, vol. 10, No. 5, May 2001).*

Solachidis et al. ("Circularly Symmetric Watermark embedding in 2-D DFT Domain", IEEE Transaction on Image Processing, vol. 10, No. 11, Nov. 2001).*

International Search Report, International Patent Application No. PCT/EP2005/055204, Jan. 23, 2006.

Melgosa, M., et al., "Suprathreshold Color-Difference Ellipsoids for Surface Colors", Color Research and Application, vol. 22:3, pp. 148-155 (Jun. 1997).

McCourt, M. E., "Comparing the Spatial-Frequency Response of First-Order and Second-Order Lateral Visual Interactions: Grating Induction and Contrast-Contrast", Perception, vol. 34, pp. 501-510 (2005).

http://www.randomnumbers.info/, as printed on Aug. 15, 2007.

* cited by examiner

BANKNOTES WITH A PRINTED SECURITY IMAGE THAT CAN BE DETECTED WITH ONE-DIMENSIONAL SIGNAL PROCESSING

STATE OF THE ART

Many solutions have been developed in the past to allow an easy detection of counterfeited documents. A different, and more direct approach, is to actually deter the counterfeiting operation. In this case, the document carries a security feature, which is detectable by the hardware/software used for counterfeiting, and triggers an action such as stopping the copying or scanning process. Existing solutions are either based on optically visible features or invisible elements using special consumables or digital signal processing methods. When focusing on features requiring no special consumables, such as security inks, the visible solutions lack robustness against workarounds of counterfeiters and the invisible solutions put some constraints on the computational power and memory used by the detector. It should be noted that in both cases feature detection is usually based and a digital image acquisition followed by a signal processing method to digitally detect the security feature. As a consequence, detectors for invisible solutions cannot be implemented directly into frequently used counterfeiting hardware having low computational capabilities (e.g. printers, scanners, monitors, digital cameras, etc.) but must be embedded in software at the computer level. The current invention describes a way to circumvent this limitation by using a special detection/pattern combination allowing for both visible and invisible features and low complexity detection.

Several techniques used for protecting valuable documents against illegal duplication use small, localized variations of the visual appearance of the protected documents. These variations can take the form of a human-readable pattern (microtext, evolutionary screen dots [U.S. Pat. No. 6,198, 545], moiré patterns [U.S. Pat. No. 5,995,638], microstructure color differences [EP 1073257A1]), or they can be implemented using invisible, but machine-readable patterns (Cryptoglyph WO01/00560, WO03/04178). In either case, authenticating a document protected by these methods requires the access to a significantly large digitized area of the document at some or all times during the authentication process. In digital signal processing this is translated into performing a computation on a 2D (two dimensional) matrix composed of pixel values of the acquired image.

This requirement poses two problems. A first problem arises with the authentication of a document in the case where a minimum document surface is not available in its entirety at some time during the authentication process. This is for instance the case for documents that are digitally transmitted over a serial line or a bus system, e.g. document transmission from a scanner to a computer, from a camera to a computer, from a computer to a printer, between two computers or between a computer and a mobile phone.

A second problem arises when the authentication of documents has to be performed by devices that have only little memory or a low processing power. When the size of the document increases in a linear fashion, the memory and time required to process the document increase in a geometrical fashion. Therefore, authenticating security documents used in everyday life, e.g. banknotes, plane tickets or ID cards, is a major problem for devices such as scanners, printers, digital cameras and mobile phones.

One important approach for invisible signal embedding is referred in the literature as "digital watermarking". Digimarc describes several approaches especially suitable for banknotes in U.S. Pat. No. 6,771,796, U.S. Pat. No. 6,754,377, U.S. Pat. No. 6,567,534, U.S. Pat. No. 6,449,377. These approaches rely on modifications performed at a microscopic level (i.e. 40 um or lower, corresponding to about 600 dpi resolution). These modifications are done in such a way that they can be detected at a macroscopic level (i.e. using 100 dpi scanning resolution), but are generally invisible for the naked eye (Digimarc also describes some techniques yielding to visible alterations in U.S. Pat. No. 6,674,886 and U.S. Pat. No. 6,345,104). The detection of the digital watermark and decoding of the embedded data are performed using combinations of image processing algorithms which can be found in the digital watermarking literature. Some of these algorithms include in particular reference patterns in Fourier domain (for affine transform registration), cross-correlation in the spatial domain (for registration against image shift) and correlation in order to decode the signal. It should be highlighted that the most challenging part of the detection process is usually to define a process that is robust against geometrical transformations as well as reaching satisfying reliability performance. In some cases, a so-called "fragile digital watermarking" technique is used. With this technique, the embedded signal disappears when a copy of the protected document is performed. It enables to distinguish between original documents and copies. One example of such an approach is described in WO2004/051917. Other approaches enable data embedding in halftone images. Many solutions rely on an optical, analog process for revealing the data. However, some solutions are also based on digital processing. In this case the common technique is to modify slightly the threshold matrix in order to embed some information. Basically, any halftone image produced using this matrix and the original gray level image carries the signal. One solution is described in U.S. Pat. No. 6,760,464 (and U.S. Pat. No. 6,694,041) and another approach is also presented in U.S. Pat. No. 6,723,121 each with a different watermarking technique. A more generic approach which does not specify a particular digital watermarking technique is described in U.S. Pat. No. 6,775,394. Some approaches do not use digital watermarking technique (in the sense of robust steganography), like in U.S. Pat. No. 6,839,450 where authors describe a detection method of data embedded in halftone images using matched filter. It is possible to significantly improve embedding performance in half-tone images by using modified version of more sophisticated half-toning scheme. For instance, US2003021437 gives a description of a generation of a dither matrix produced from a bitmap using morphological operations. Dither matrix is then used for producing halftone images, which may be used in security printing. Inserting a signal into a digital media or printing it on a document and detecting it later has been address extensively in older patents. From a technical point of view the main issues to solve are signal design, signal embedding and signal detection. Here, signal can be a modification applied to an existing image or the generation of an independent signal and printing it over an existing document overlaying it onto a digital image. Signal design is largely driven by the function behavior of the detector. It is desirable that the detector can detect or retrieve the embedded signal independently of possible geometrical transformations applied to the protected media. To solve this challenge it is state of the art in digital marking technologies to either embed additional key characteristics in the spatial or even frequency domain that later allow for the identification of the geometrical transformation and its inversion (for instance the U.S. Pat. No. 6,408,082, U.S. Pat. No. 6,704,869 and U.S. Pat. No. 6,424,725 describe approaches where a log-polar in the transform domain is used to compute the geometrical transform).

A different approach is based on the design and embedding of an auto-similar signal. During detection an auto-correlation function is computed. The analysis of the auto-correlation function then allows for the identification of the geometrical transformations and their inversions.

All the above solutions solve the problem of robust detection using 2-dimensional processing techniques for continuous or halftone images. However, none of them perform this detection using a 1D signal processing, which is required for applications based on low computing power systems.

A 1D solution is described in AU 2002951815 where the inventors proposed an approach to mark digital images with embedded signal where the signals are represented by a 2D pattern constructed using a 1D basis function. For the detection of the pattern, the inventors first compute a projective transformation of the image in and then retrieve the embedded information through a 1D correlation at different angles. However, since the correlation has to be re-computed for each angle, the overall complexity is still of the same order as for the 2D processing described above.

BRIEF DESCRIPTION OF THE INVENTION

The present invention aims to propose a method to generate a security pattern comprising a printed security image, said image comprising an original image and a security pattern, characterized in that, said security pattern being obtained by a predefined inverse integral transform of the combination between an auxiliary image and a two-dimensional pattern created by sweeping a one-dimensional function along a predefined curve, such as said security pattern being detectable from correlation properties of one line of said secured banknote sampled along any arbitrary direction and with any resolution between 50 and 1200 dots per inch, the security image being generated by the merging of at least one color of at least a part of the original image with the security pattern.

The present invention consists of two methods summarized below:

The first method is used for generating a security document by applying a security pattern to an original document, for instance under the form of a linear grating. This method for generating a security image, such image comprising an original image and a security pattern, has the particularity that the security pattern has the form of a signal swept along a predefined curve, in which the lines width and/or the line spacing is modulated to embody a predefined data, the security image is then generated by the modulation of at least one color of at least a part of the original image with the grating. Basically, in the particular case where the curve is a straight line used in the spatial domain, this security pattern is similar to a barcode. In another particular case, the curve takes the form of a circle in the domain of a predefined integral transform (e.g. a Fourier transform or a Hilbert transform), and the pattern is combined with an auxiliary image before the combination undergoes an inverse integral transform. The result of this inverse integral transform is then merged with the original image using an approach based on digital halftoning. Some of the underlying principles of another merging process are defined in AlpVision patent CH694233. This approach is based on the overprint of a low density set of dots over an image. Doing so creates a so-called "asymmetrical modulation" (since generally printing inks only decrease the local luminance) which is used to secretly embed a signal.

The second method is used for authenticating a security document generated with the first method by detecting the presence of the security pattern in arbitrarily located, rotated and scaled lines of the document (the independence from scaling factor enables to successfully detect the security pattern on a whole range of printing resolutions, typically from 50 to 1200 dpi). The detection is performed using a one-dimensional signal processing. This enables a very low complexity computation compared to classical image processing approaches described in the state of the art above. In particular, it is then possible to embed the detection process into simple hardware like printer or scanner, enabling to implement a functionality of counterfeit deterrence by stopping the copy process when a banknote is detected.

BRIEF DESCRIPTION OF THE FIGURES

The invention will be better understood thanks to the attached Figures in which.

DETAILED DESCRIPTION OF THE INVENTION

Signal Embedding

Figure 13:
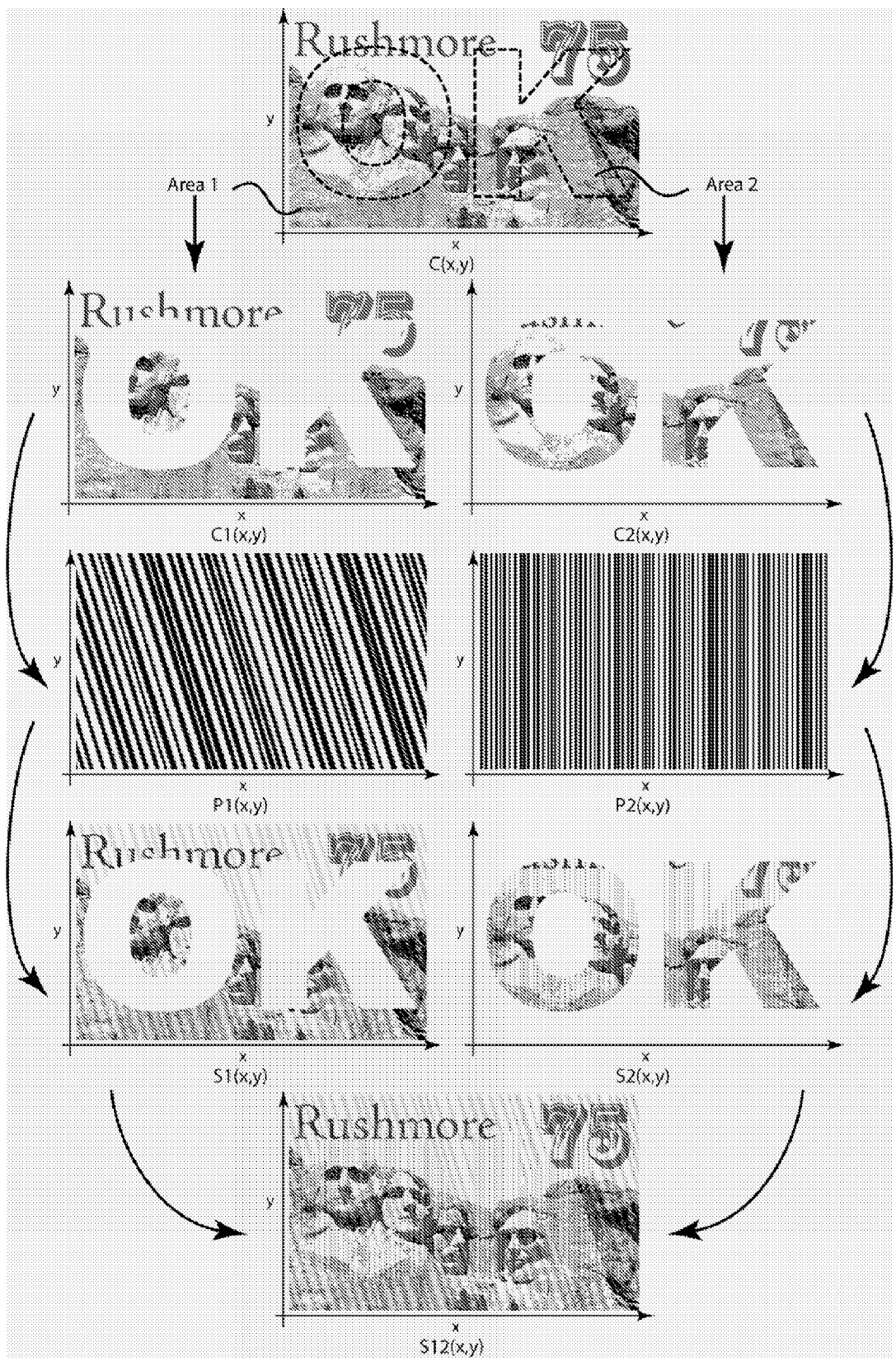
FIG. 13 shows an example in which the image is split into sub-areas, each of them embedded with a different security pattern.
Figure 14:
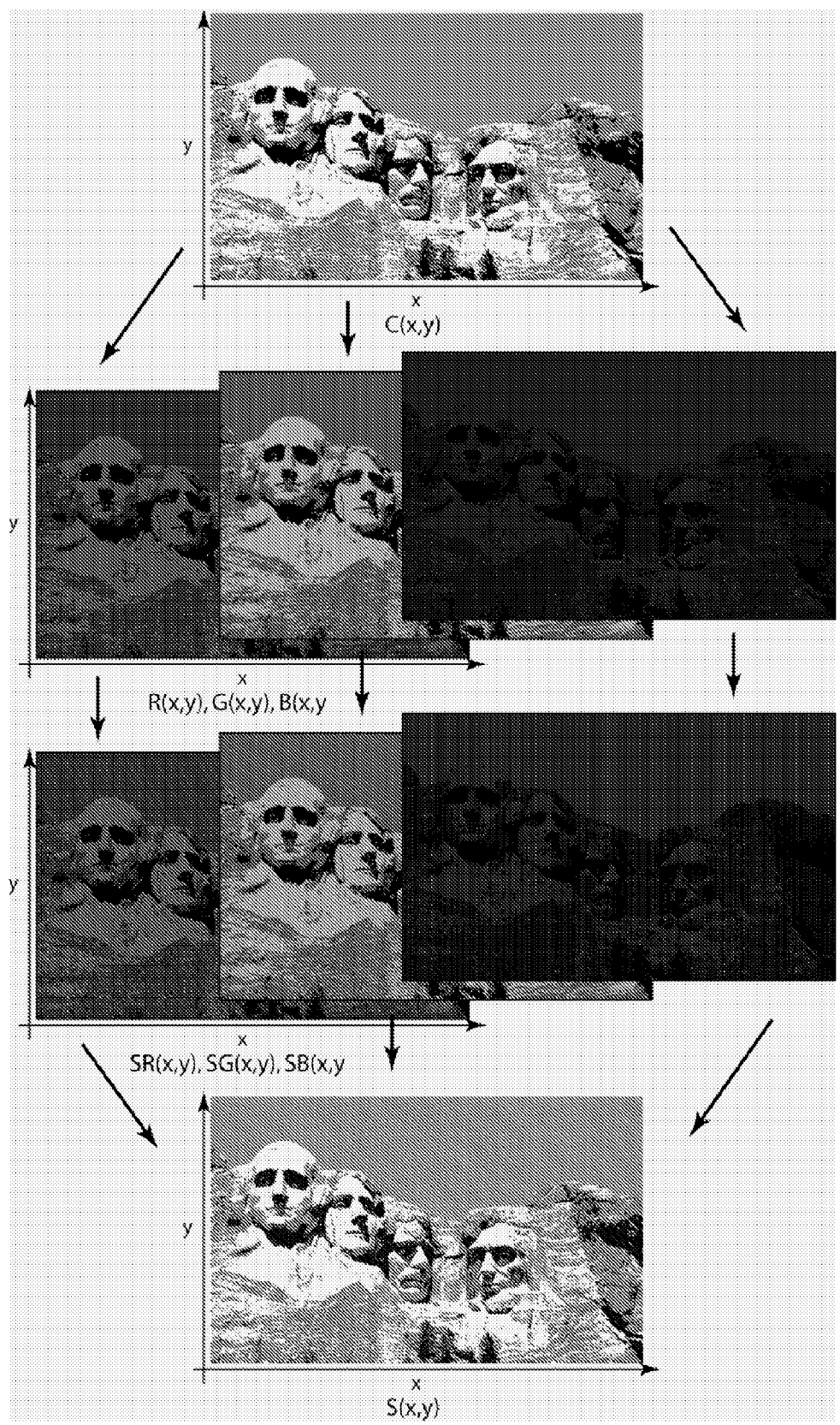
FIG. 14 shows an example, in which the pattern is embodied in each color component.

The signal is embedded by overprinting a light and visually non-disturbing pattern across an existing design (the pattern can be overlaid in digital domain). The visual disturbance induced by the embedded pattern is kept below the visual perception threshold thanks to a combination of two factors. First, the chromatic variations induced by the embedded pattern are kept under a specific visual threshold based on just noticeable differences (Melgosa, M., Hita, E., Poza, A. J., Alman, David H., Berns, Roy S., Suprathreshold Color-Difference Ellipsoids for Surface Colors, Color Research and Application 22, 148-155, June 1997.). Secondly, the spatial frequency of the pattern is kept at sufficiently high value, so that the chromatic contrast formed by its individual parts goes unnoticed (McCourt, Marc E., Spatial frequency tuning, contrast tuning, and spatial summation of suprathreshold lateral spatial interactions: Grating induction and contrast-contrast, OSA Annual Meeting Technical Digest 16, 155, 1993). The joint use of these chromatic and frequency criteria enable to obtain simultaneously a security pattern that combines the advantages of a low resolution (compared to the resolution of existing design), a high signal amplitude and a low visibility (as shown in (FIG. 13 and FIG. 14).

A second method for embedding the signal uses the linear grating as a basis for producing a halftone screen. With this method, the width of the stripes composing the grating varies accordingly to the intensity levels present in the original image (see FIG. 15). A security document generated by such a method takes the form of a halftone image rendered with a line-based halftone screen (see FIG. 16).

A third method for embedding the signal in printed images uses a printing process capable of producing stripes with a controllable thickness, such as intaglio printing. With this method, the security pattern is printed as an overlay on the original image, either by using an additional intaglio plate or by modifying an already existing plate. By using a transparent or a semi-transparent ink (e.g. a varnish) and by controlling the thickness of the printed stripes, it is possible to control the embedding strength of the overlaid pattern.

Figure 17:
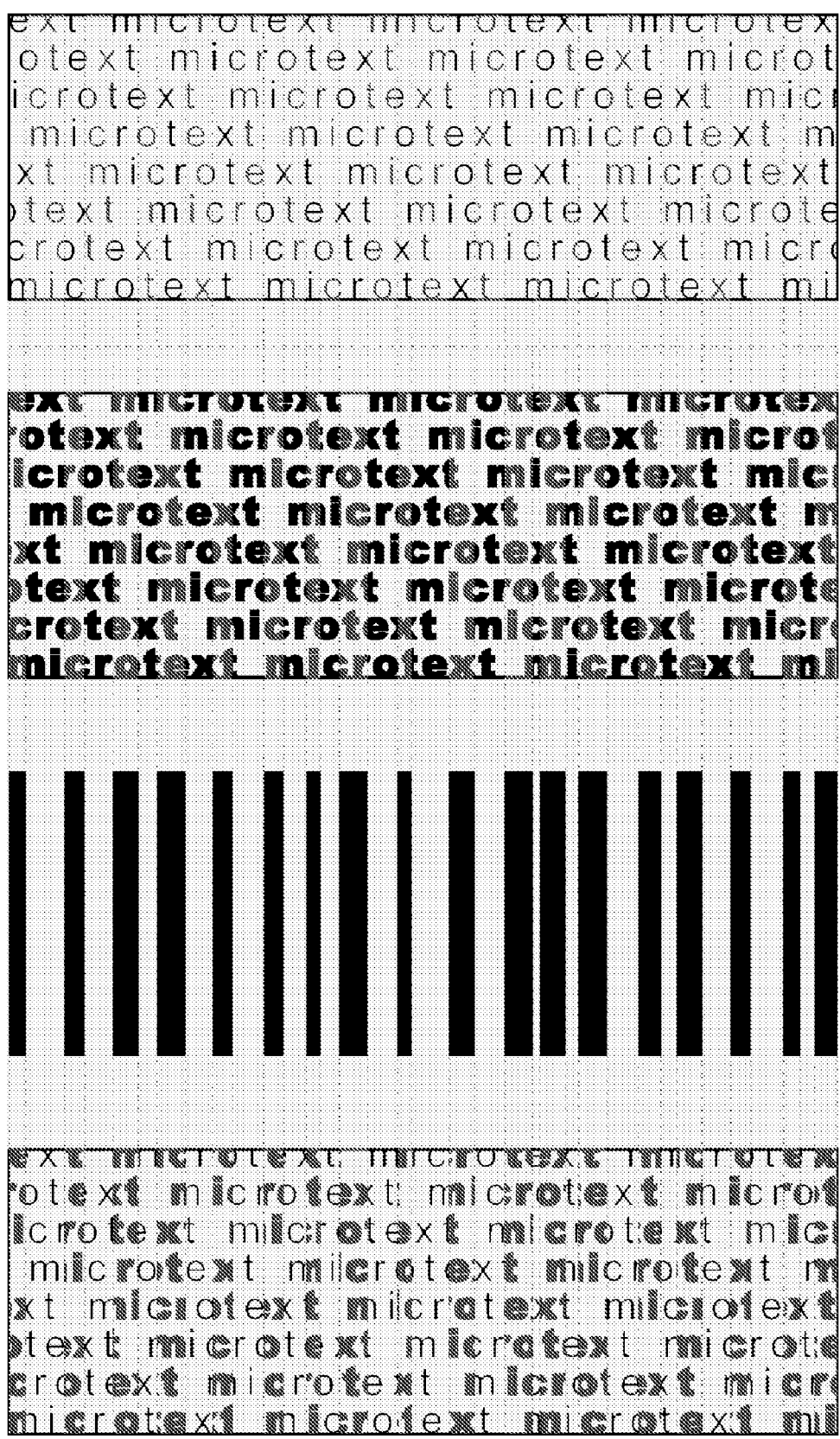
FIG. 17 shows a thickening modulation of a text.

A fourth method for embedding the signal in microstructure, digital images (e.g. halftone images or digital images containing a microtext) consists in applying local modifications to the microstructure. These local modifications have the effect of thickening the microstructure in the parts where the stripes of the pattern are thicker, and they have the effect of thinning the microstructure in the parts where the stripes of the pattern are thinner (FIG. 17). At a macroscopic level, areas with a thickened microstructure have a higher intensity value and areas with a thinned microstructure have lower intensity.

Figure 21:
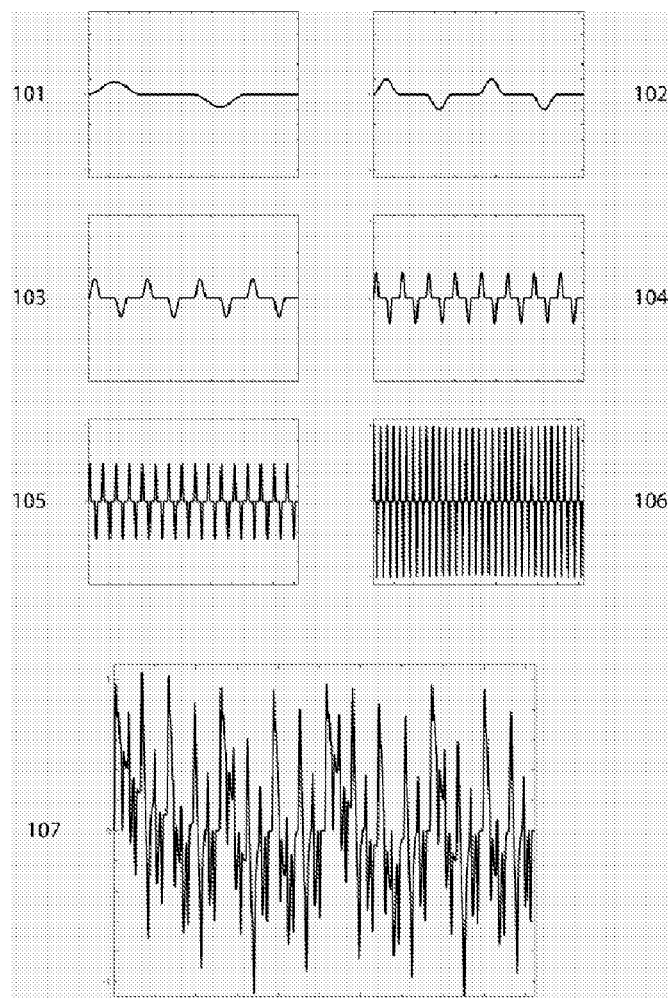
FIG. 21 shows an auto-correlated, one-dimensional signal built by summing a set of periodical functions that differ only by their period.
Figure 22:
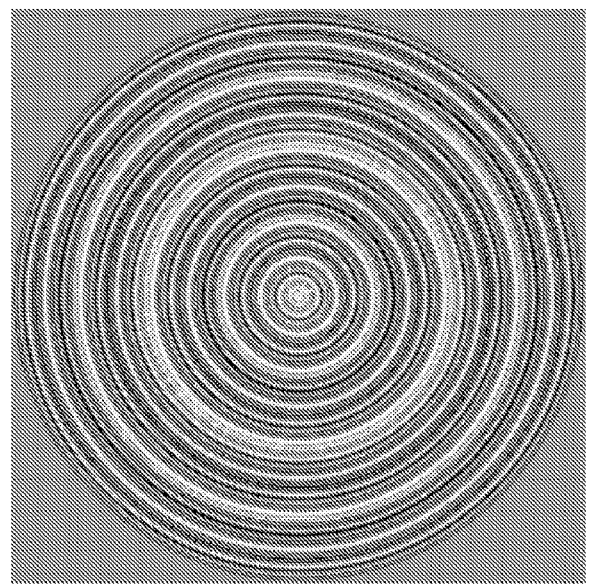
FIG. 22 shows a circularly symmetric, two-dimensional signal built by sweeping an auto-correlated, one-dimensional signal.
Figure 23:
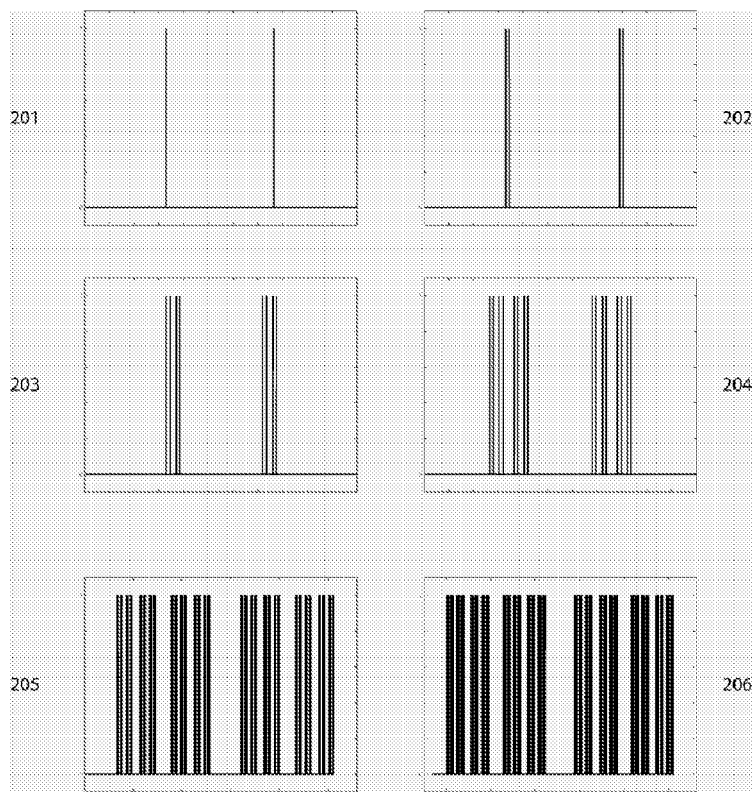
FIG. 23 shows a self-similar, one-dimensional signal built by recursively replacing portions of a simple function with scaled-down copies of itself.
Figure 24:
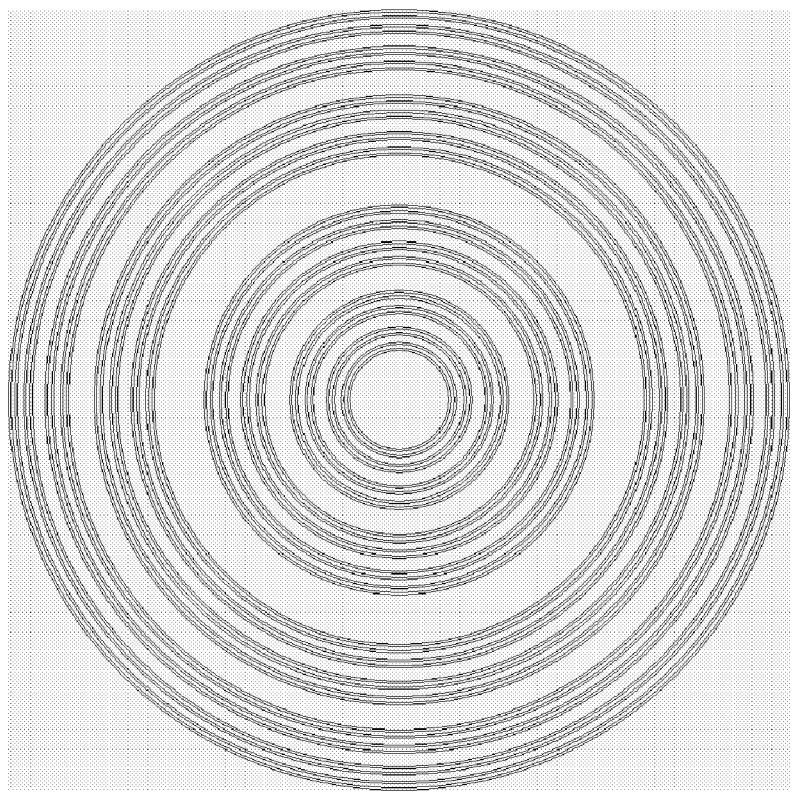
FIG. 24 shows a circularly symmetric, two-dimensional signal built by sweeping a self-similar, one-dimensional signal.
Figure 25:
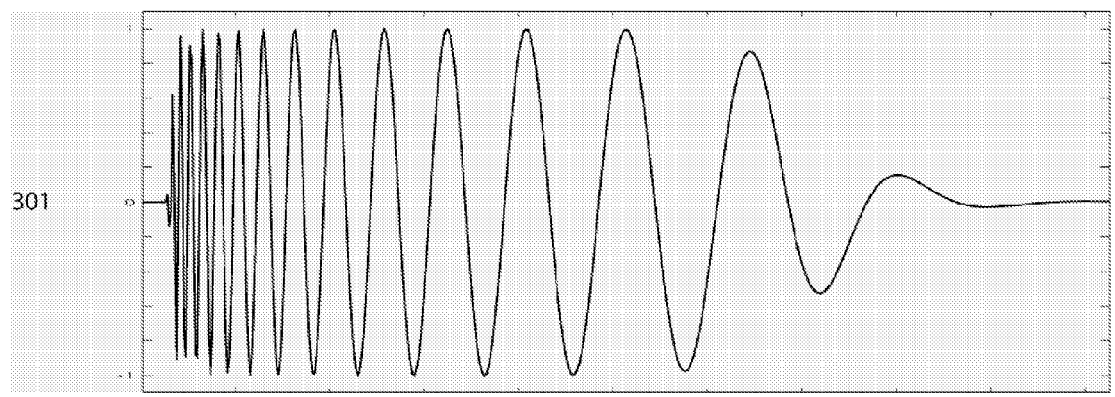
FIG. 25 shows a one-dimensional signal that is scale-invariant across a given range of scaling factors.
Figure 26:
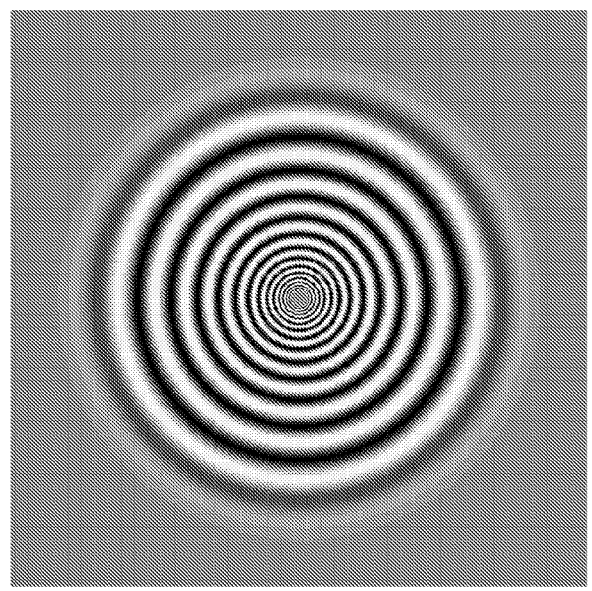
FIG. 26 shows a circularly symmetric, two-dimensional signal built by sweeping a scale-invariant, one-dimensional signal.
Figure 27:
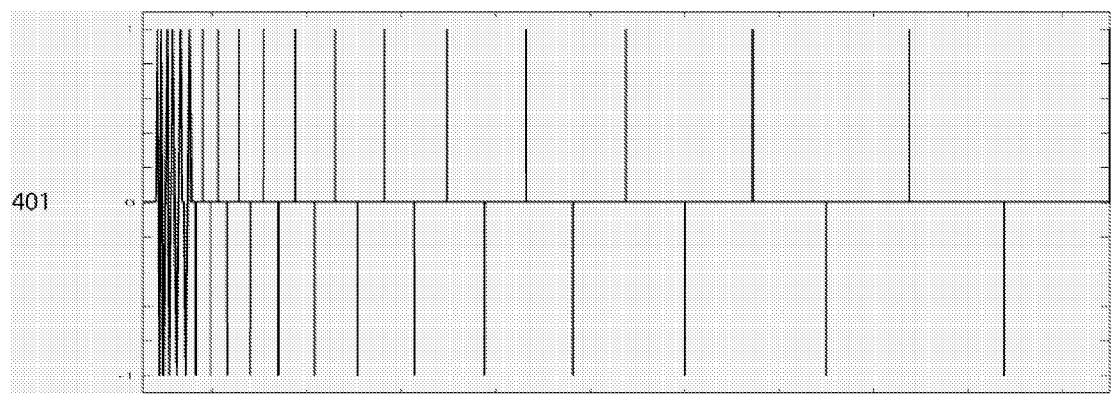
FIG. 27 shows another one-dimensional signal that is scale-invariant across a given range of scaling factors.
Figure 28:
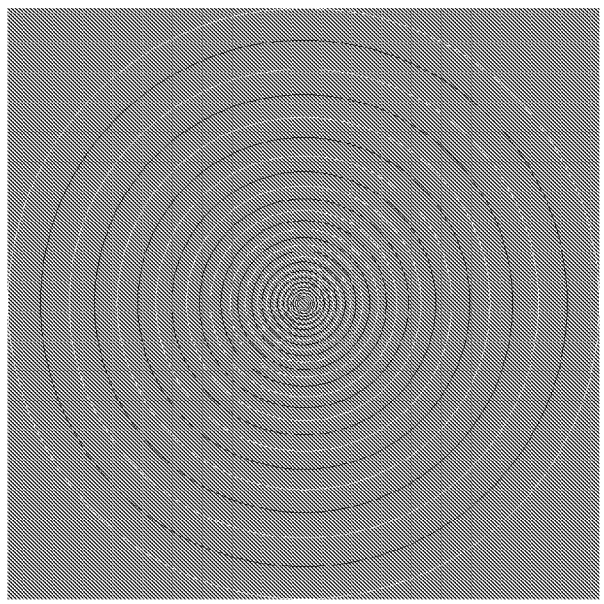
FIG. 28 shows another circularly symmetric, two-dimensional signal built by sweeping a scale-invariant, one-dimensional signal.
Figure 29:
FIG. 29 shows a one-dimensional, bandpass filter built by a combination of Butterworth filters.
Figure 30:
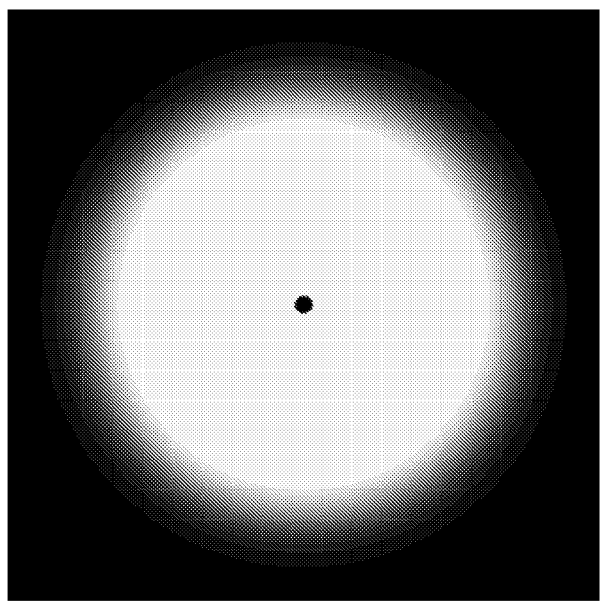
FIG. 30 shows a two-dimensional, bandpass filter built by sweeping a one-dimensional, bandpass filter.

A fifth method replaces the linear grating image by a circularly symmetric grating image. This circularly symmetric grating is obtained by sweeping a one-dimensional signal across a 360-degree arc. The property of circular symmetry guarantees that the signal observed along a straight line crossing the grating at its center remains the same for all angles of the line. The signal is then embedded using the first, the third or the fourth method. Examples of circularly symmetric signals are provided in FIG. 22, FIG. 24, FIG. 26 and FIG. 28. In FIG. 22, the 2D signal is built by sweeping the auto-correlated 1D signal depicted in FIG. 21 along a 360-degree arc. In FIG. 24, the 2D signal is built by sweeping the self-similar 1D signal depicted in FIG. 23 along a 360-degree arc. In FIG. 26, the 2D signal is built by sweeping the scale-invariant 1D signal depicted in FIG. 25 along a 360-degree arc. In FIG. 28, the 2D signal is built by sweeping the scale-invariant 1D signal depicted in FIG. 27 along a 360-degree arc.

A sixth method for embedding a circularly symmetric grating uses an inverse integral transform. An integral transform is any transform $T_f$ of the form:

$$T_f = T(f(u)) = \int_{t1}^{t2} f(t) K(t, u) dt$$

where the function K(t,u) is the kernel of the transform. The simplest example of an integral transform is the identity transform, with $K(u,t)=\delta(u-t)$ ($\delta$ is the Dirac distribution), $t_1<u$, $t_2>u$. Another example is the Laplace transform, with $K(u,t)=e^{-ut}$, $t1=0$, $t2=\infty$. Yet another example commonly used in signal processing is the Fourier transform, with $$K(u,t) = \frac{e^{iut}}{\sqrt{2\pi}}, t1 = -\infty, t2 = \infty.$$

Figure 35:
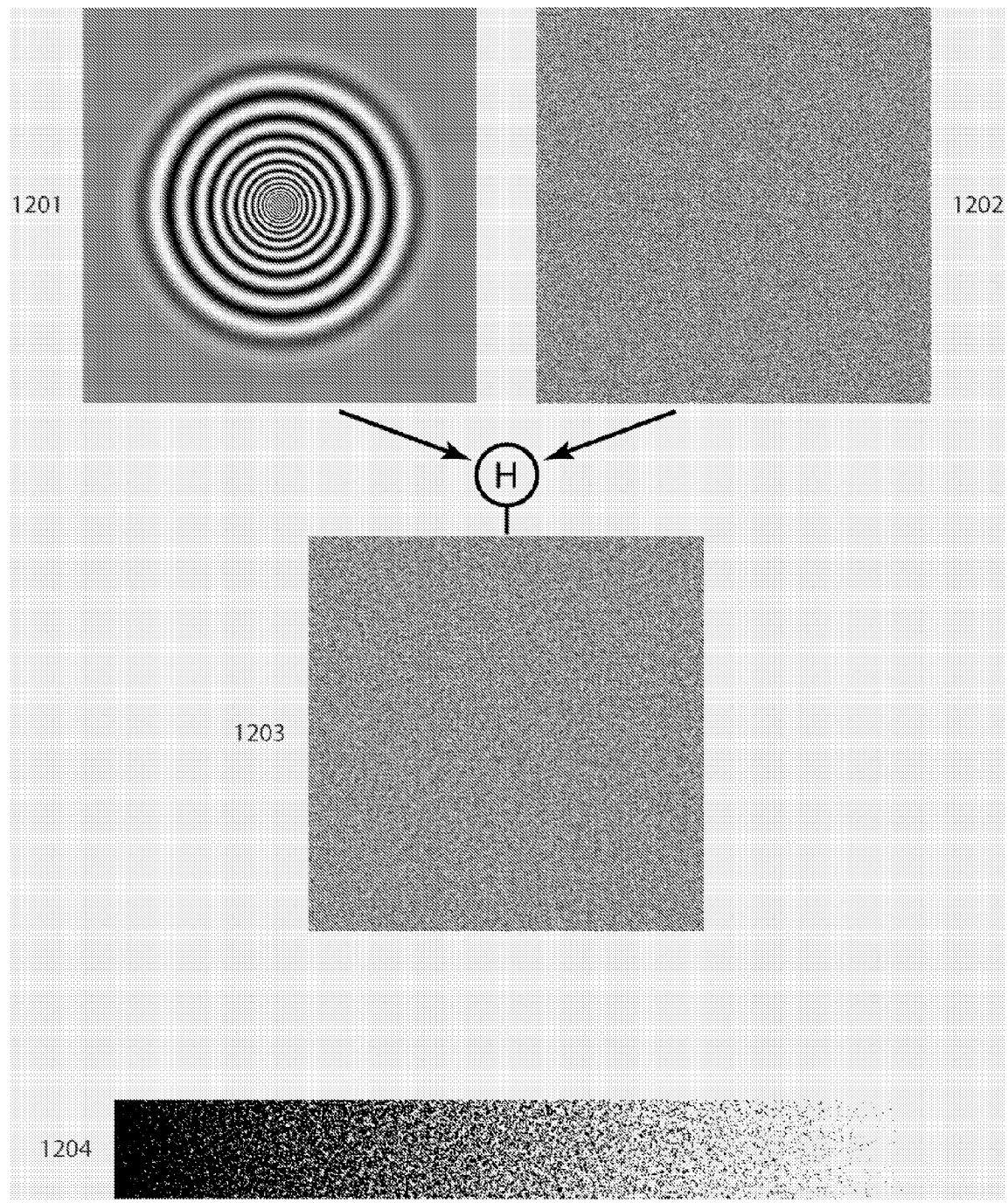
FIG. 35 shows the embedding of a circularly symmetric pattern in the frequency domain and a bilevel halftone gradation.

The selected inverse integral transform is applied to a pair of components. The first component is a module component R; it is generated with a circularly symmetric grating. The second component is a phase component P; it is generated with the output of a quantum random number generator (e.g. http://www.randomnumbers.info/) or a pseudo-random number generator. The module component are used together to produce an array A of complex numbers using the relation $C(x,y)=R(x,y)*exp(i*P(x,y))$, where i denotes the square root of −1. The result A* of the inverse Fourier transform of C yields a signal that looks like white noise, but that exhibit the original grating in the frequency domain. The signal A* is then printed onto the banknote using the first, the third or the fourth method. FIG. 35 shows an example of embedding a circularly symmetric grating in the frequency domain. A Fourier transform (H) is synthesized by combining a module based on a circularly symmetric signal (1201) and a phase based on white noise (1202). The inverse Fourier transform of (H) yields a two-dimensional signal (1203) that looks like white noise.

Figure 31:
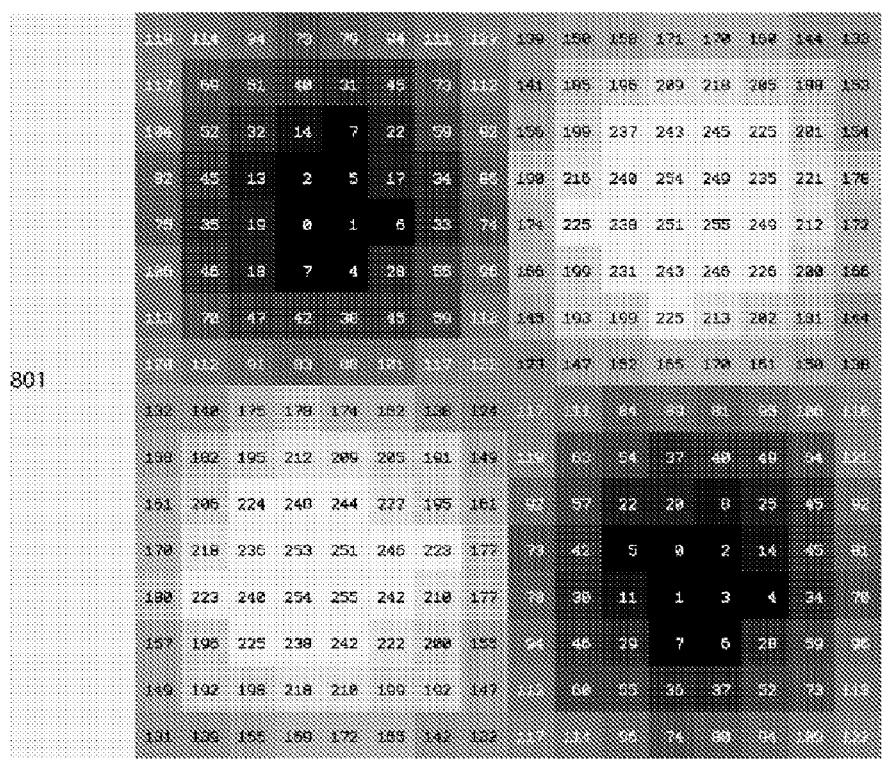
FIG. 31 shows two superimposed representations of the same dither matrix.
Figure 32:
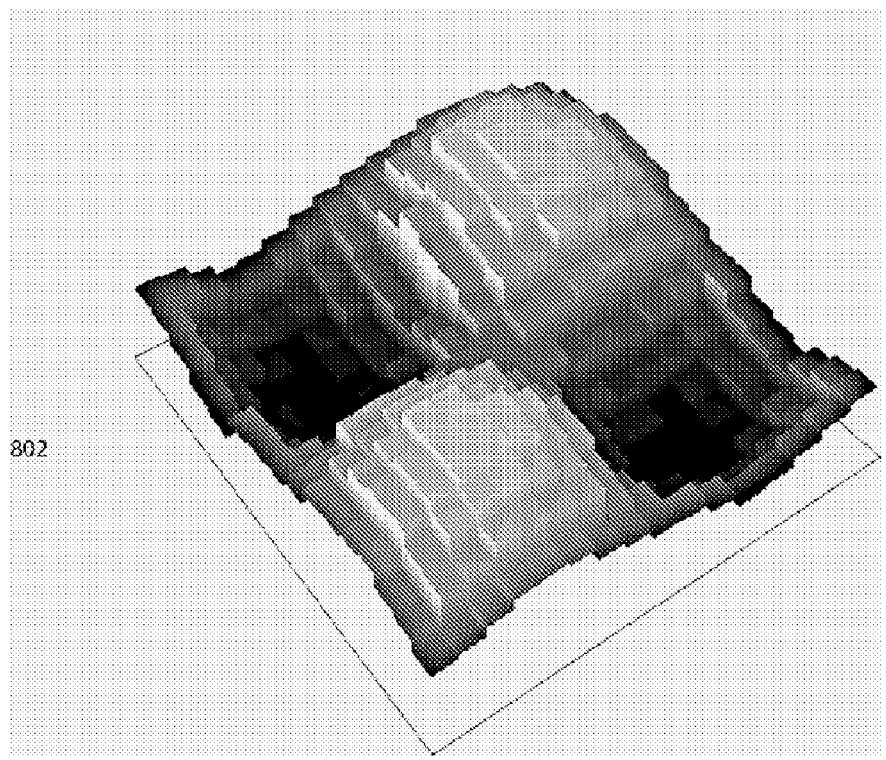
FIG. 32 shows a three-dimensional representation of a spot function.
Figure 33:
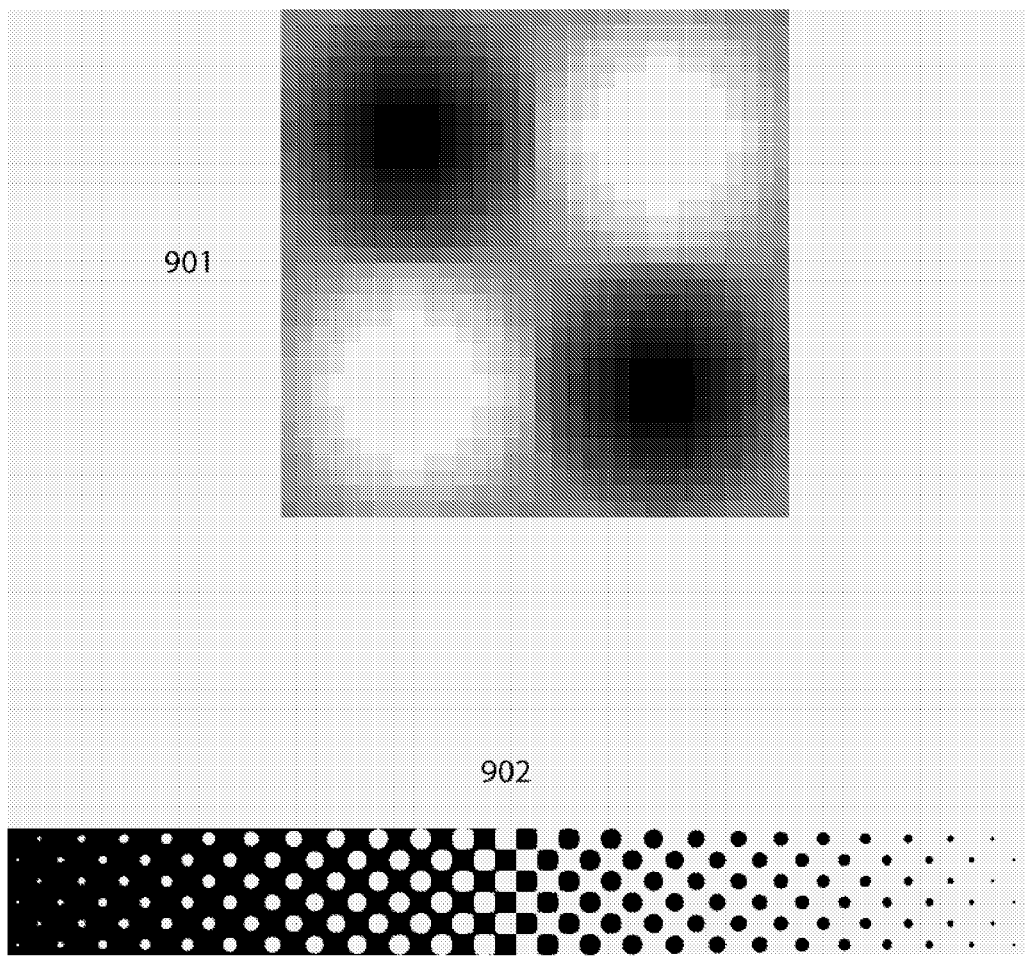
FIG. 33 shows an example of a dither matrix and a bilevel halftone gradation obtained with this dither matrix.
Figure 34:
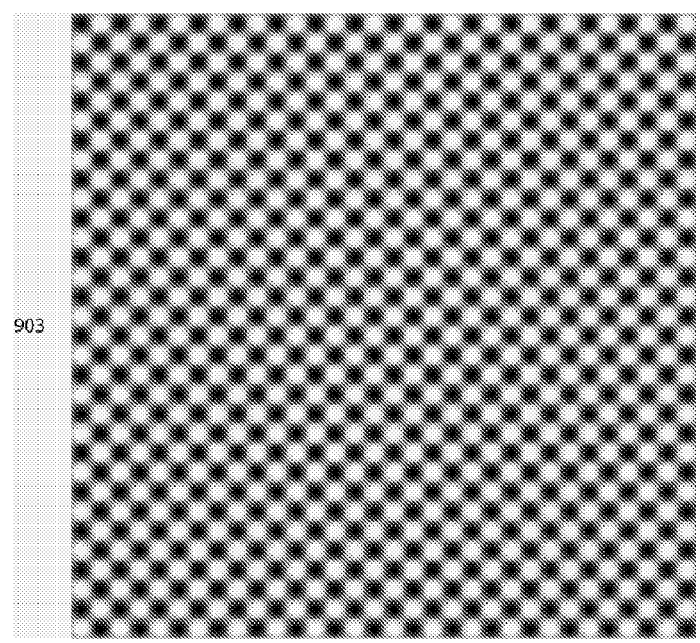
FIG. 34 shows a large dither matrix built by tiling the plane with multiple copies of a smaller dither matrix.

A seventh method uses a circularly symmetric grating embedded in the frequency domain as a spot function for thresholding a grayscale image. An example of a three-dimensional representation of a general spot function is shown in FIG. 32: the values of the spot function are materialized by steps of varying heights that have a grayscale value corresponding to their height. The embedded spot function is then discretized in so as to produce a dither matrix that can be used to threshold a grayscale image in order to generate a bilevel halftone image. An example of a dither matrix is shown in FIG. 31: a first representation is given by an array of numerical thresholds that are uniformly distributed between 0 and 255, and a second representation of the same dither matrix is given by an array of grayscale values that correspond to the numerical thresholds of the first representation. FIG. 33 shows another example of a dither matrix (901) represented as an array of grayscale values; this dither matrix is used to threshold a linear grayscale gradation in order to produce a bilevel halftone gradation (902). The size of the dither matrix may be adapted to the size of the circularly symmetric pattern by building a second, larger dither matrix as a tiling of the first dither matrix, as shown in FIG. 34. By construction, a halftone image thresholded using a dither matrix built with an embedded spot function will exhibit the embedded circularly symmetric grating in the frequency domain. This two-dimensional signal is normalized so as to yield the desired spot function. FIG. 35 shows an example of using a two-dimensional signal (1203) as a spot function in order to threshold a linear grayscale gradation in order to produce a bilevel halftone gradation (1204).

Figure 36:
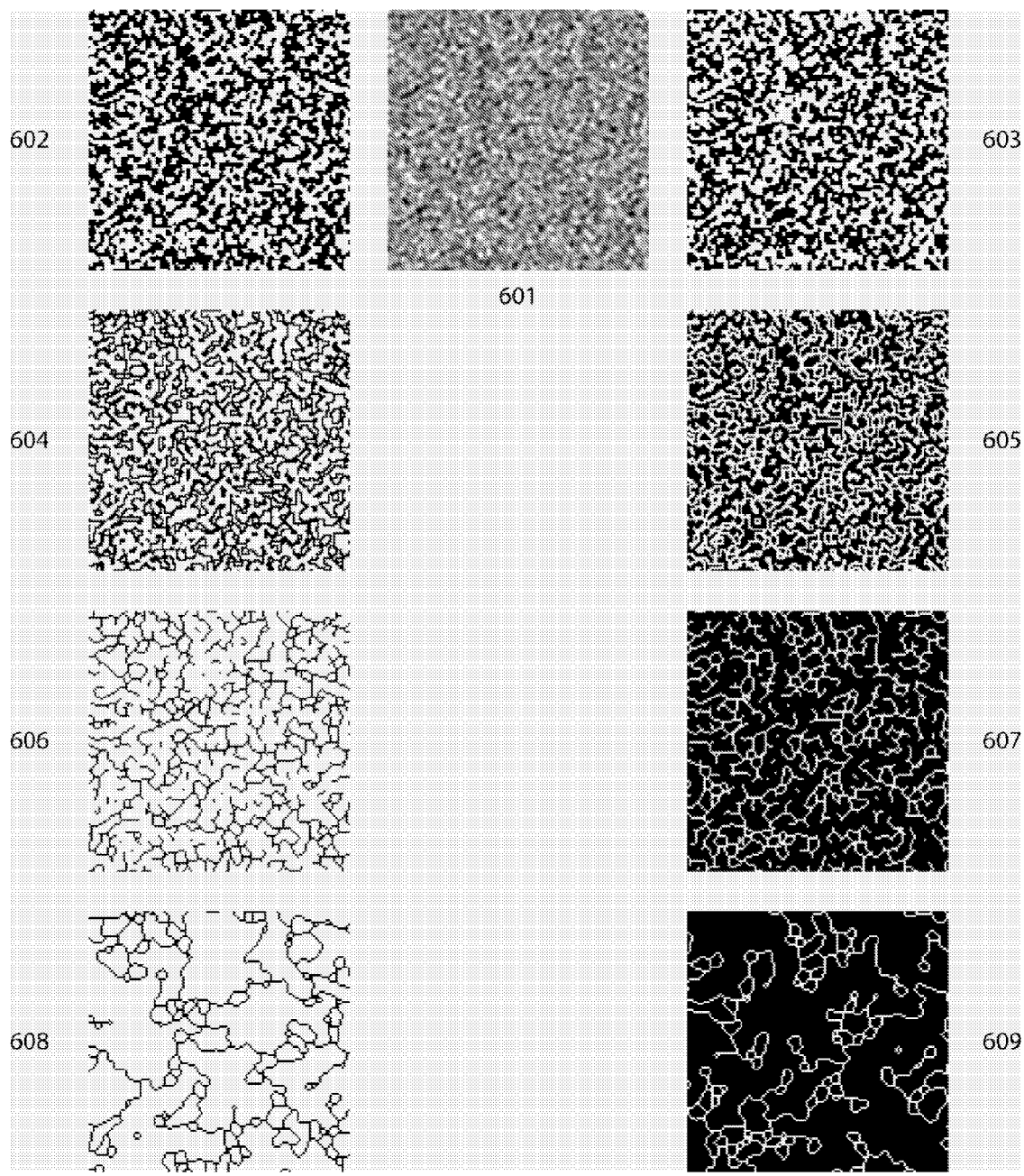
FIG. 36 shows the result of various morphological operations applied to a discretized spot function.
Figure 37:
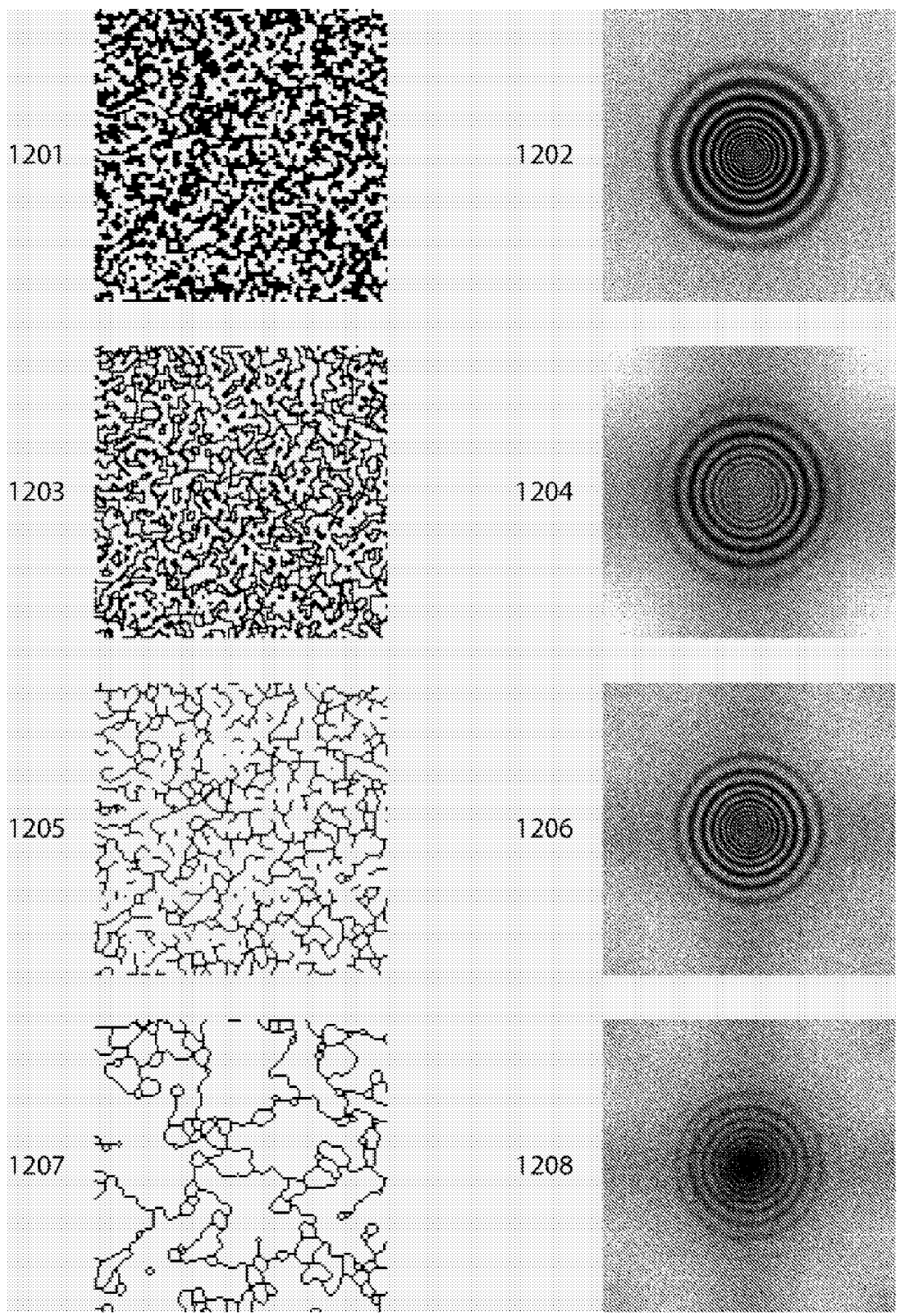
FIG. 37 shows the module of the Fourier transform of morphological operations applied to an embedded pattern.
Figure 38:
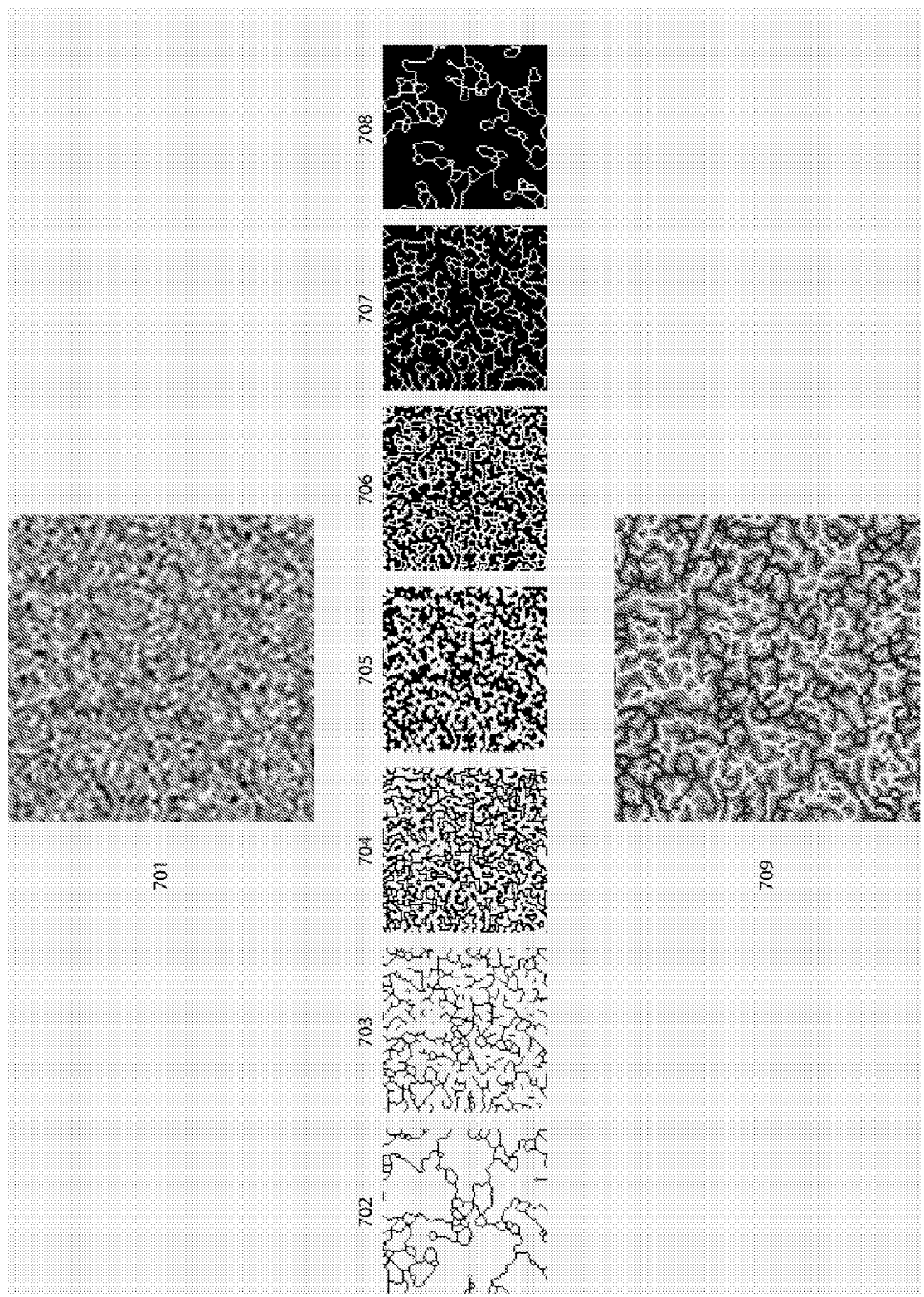
FIG. 38 shows the construction of a dither matrix based on the results of various morphological operations.
Figure 39:
FIG. 39 shows a bilevel halftone gradation produced by thresholding a grayscale image with a morphological dither matrix.

An eighth method builds an embedded spot function based on a signal A* constructed with the fifth method. The continuous signal A* is thresholded in order to produce an array B of black and white pixels. The array B is duplicated so as to produce identical copies $\{B_1, B_2, \ldots B_n\}$. Each copy $B_k$ (k= 1 . . . n) undergoes a different series of morphological operation such as inversion, dilation, erosion, pruning, opening, closing, skeletonization, extraction of outlines. FIG. 36 shows an example of morphological operations applied to a discretized spot function. A square area (601) of the spot function (1203) depicted in FIG. 35 is thresholded (602) so that half its elements are black and the other half are white. The outlines of this bitmap are shown in (604). The skeleton of the same bitmap is shown in (606). The pruned skeleton of the same bitmap is shown in (608). The values of the thresholded bitmap are inverted so as to produce a dual bitmap (603). The inverse outlines of this dual bitmap are shown in (605). The inverse skeleton of the same dual bitmap is shown in (607). The inverse pruned skeleton of the same dual bitmap is shown in (609). By construction, the results $\{M_1, M_2, \ldots M_n\}$ of the morphological operations will all exhibit to some degree the embedded circularly symmetric pattern in the frequency domain. This property is illustrated by FIG. 37, which shows the module of the Fourier transform of some of the morphological results depicted in FIG. 36. The same circularly symmetric pattern is visible with a variable extent and a variable clarity in each one of the transforms (1202), (1204), (1206) and (1208). The results $\{M_1, M_2, \ldots M_n\}$ of the morphological operations are then measured: for each $M_k$ (k=1 . . . n), the ratio $K_k/N_k$ is calculated, where $K_k$ is the number of black pixels in $M_k$ and $N_k$ is the total number of pixels in $M_k$. The results of the morphological operations $\{M_1, M_2, \ldots M_n\}$ are ranked according to their ratio of black pixels $K_k/N_k$. For each $M_k$, the black pixels are replaced by the value $K_k/N_k$. In the final step, all the $M_k$ are merged together to form a spot function S. The values of the individual pixels of S are calculated using the relation: $S(x,y)=\max_k(M_k(x,y))$. The ranking of the morphological steps (702-708) and their merging into a dither matrix (709) is illustrated in FIG. 38. After the merging, the dither matrix can be further enhanced in order to obtain an equilibrated dither matrix. Such an enhancement can take the form of weighted histogram equalization, or a slight Gaussian blur, or the addition of a small amount of noise. In FIG. 39, a dither matrix based on morphological operations is used to threshold a linear grayscale gradation in order to produce a bilevel halftone gradation.

Figure 40:
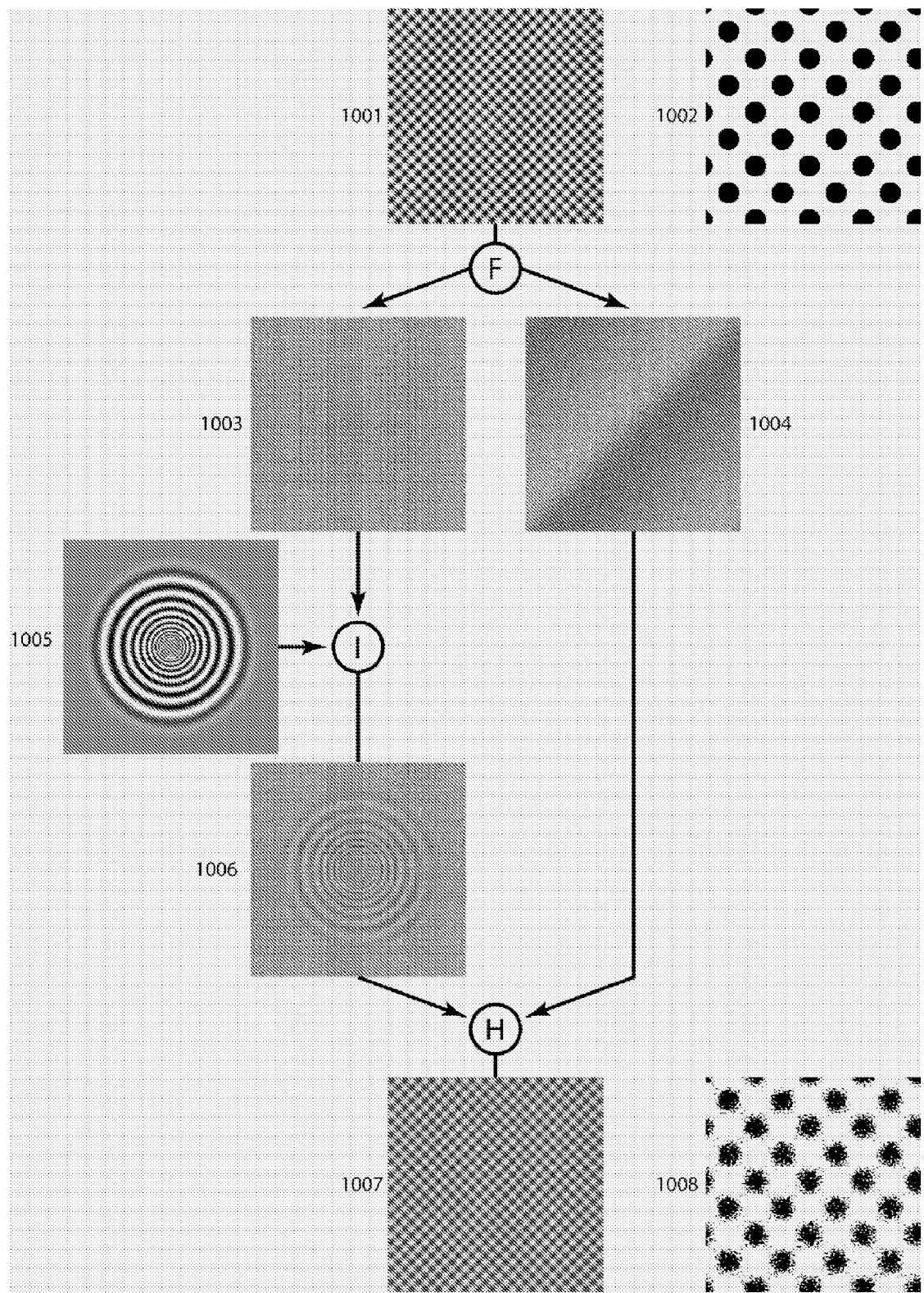
FIG. 40 shows the combination of a spot function and a circularly symmetric pattern in the frequency domain.

A ninth method builds an embedded spot function by combining a general spot function and a circularly symmetric pattern in the frequency domain. FIG. 40 shows the construction of such a combined spot function. The general spot function is embodied by the tiling (1001) of multiple copies of a simple spot function traditionally used to generate clustered-dot, amplitude-modulation halftone screens (1002). This tiling is transposed to the frequency domain by the means of a Fourier transform (F), and the result of this Fourier transform is then decomposed into a module component (1003) and a phase component (1004). A circularly symmetric pattern (1005) is combined with the module component by the means of a linear interpolation (I). Other possible combination schemes can be used, such as a multiplicative scheme, a quadratic scheme or an exponential scheme. The combined module component (1006) is merged back with the phase component (1004) using an inverse Fourier transform (H). The result of this inverse Fourier transform undergoes a histogram equalization so as to produce a balanced spot function (1007). As an example, this spot function is used to threshold a grayscale patch of constant value in order to produce a bilevel halftone patch (1008).

The above methods are not limited to a circularly symmetric grating of Fourier module; it can also be applied with any pattern obtained by sweeping a particular 1D signal in an integral transform domain.

Figure 41:
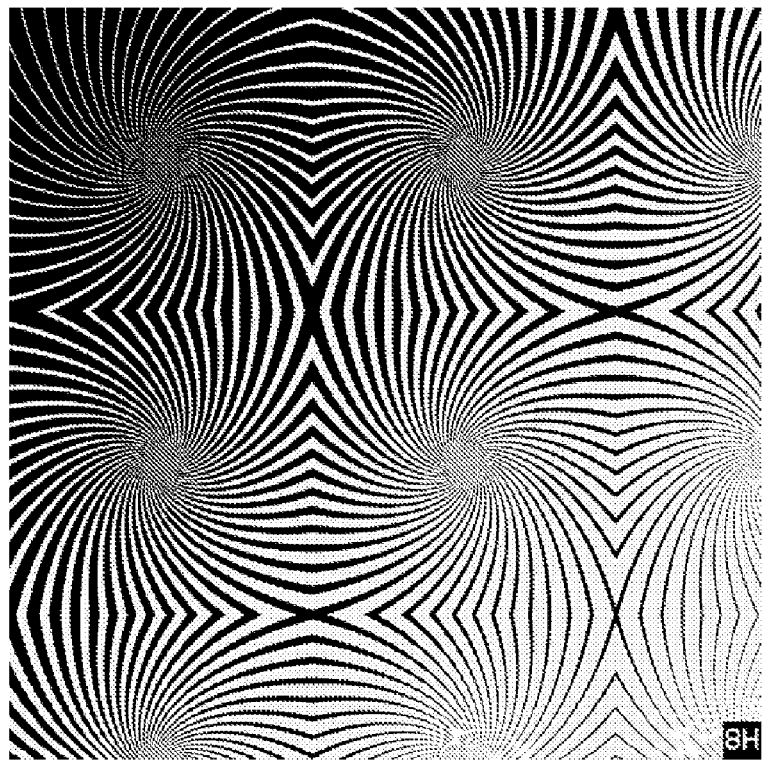
FIG. 41 shows a bilevel halftone image generated with a spot function based on a balanced circularly symmetric pattern.

A tenth method produces a dither matrix in the spatial domain by using a balanced, circularly symmetric pattern as a spot function. FIG. 41 illustrates this method with a bilevel halftone image generated by using a LRHF as spot function in order to threshold a linear grayscale gradation.

An eleventh method combines two or more spot functions generated with the tenth method in order to produce a new spot function. Combination schemes include arithmetic operations such as addition, subtraction and multiplication, N-cyclical group operations such as addition modulo N, subtraction modulo N and multiplication modulo N, geometric operations such as translation, scaling and rotation, and logical operations such as OR, AND and XOR.

Figure 42:
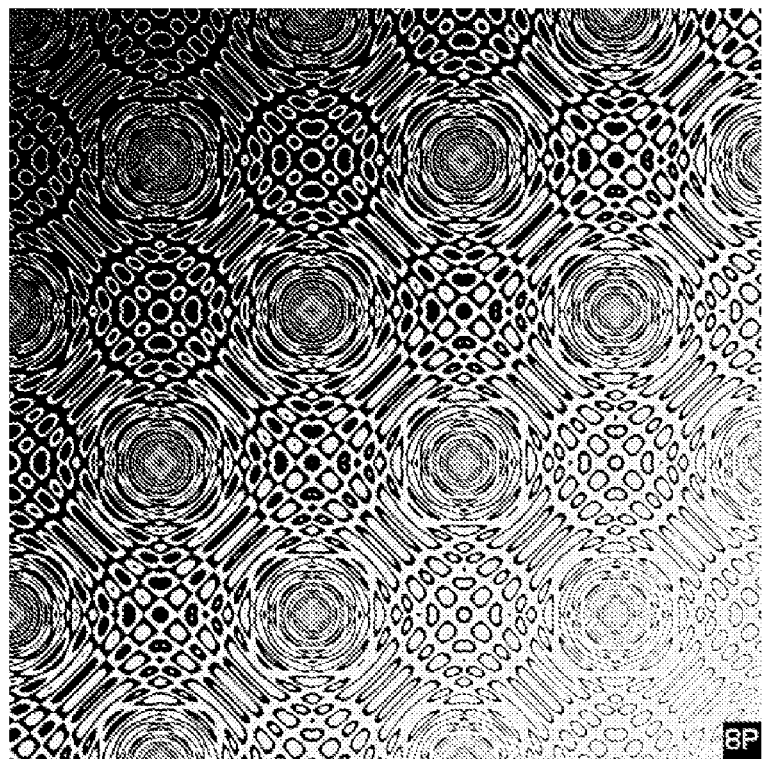
FIG. 42 shows a bilevel halftone image generated with a spot function based on a combination of two balanced circularly symmetric patterns.

FIG. 42 illustrates this method with a bilevel halftone image generated by using a spot function based on the combination of two circularly symmetric patterns. The patterns used in this example are a LRHF and a translation of the same LRHF. The combination scheme used is an addition modulo 256.

Signal Detection

The embedded pattern is typically recovered after its printout. A digital imaging device (like a digital scanner or a camera for instance) is then used to bring back the printed material in the digital domain. The pattern is designed in such a way that it is possible to trigger detection with a monodimensional signal processing performed along a straight line having an arbitrary direction across the pattern, for any scale and rotation transformations (in a previously defined range). Two issues have to be addressed in order to obtain this result: the reliability of the detection trigger (false-positive and false-negative detections) and the robustness to geometrical transforms.

The reliability of the detection basically relies on a statistical test. This test must be performed on a sufficiently large set of data in order to reach the desired false-positive (signal detected while not being present) and false-negative performance (signal not detected while being present). In the targeted application, the false-positive rate is expected to reach 1 over 10 millions or better. The statistical data can be processed during the digitization or during the printing process. Since the detection approach relies on a 1 dimensional signal processing, it may also be performed in real-time as data is streamed into the hardware into which the detection is performed.

The robustness to geometrical transforms can be achieved using two different approaches. One solution is to have a signal that is invariant with affine transformations; the other solution is to compensate for the transformation before decoding the signal.

Invariant Signal Approach

Figure 12:
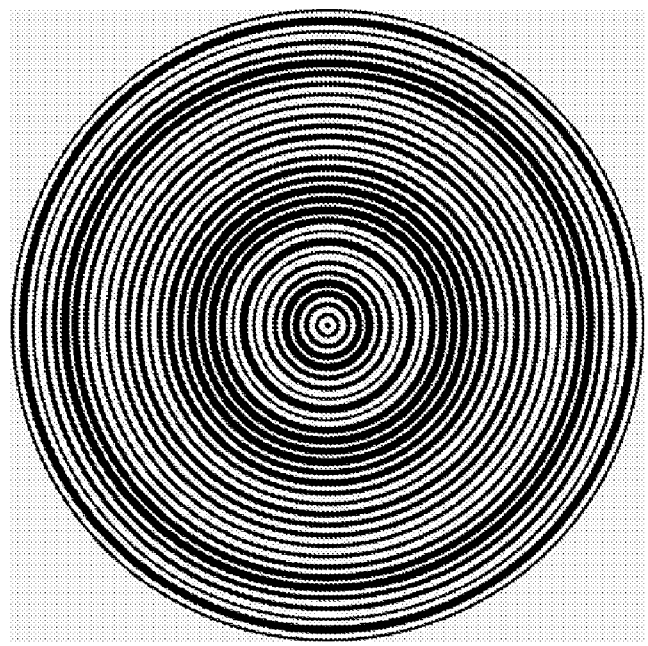
FIG. 12 shows an example of a pattern exhibiting an invariant feature.
Figure 16:
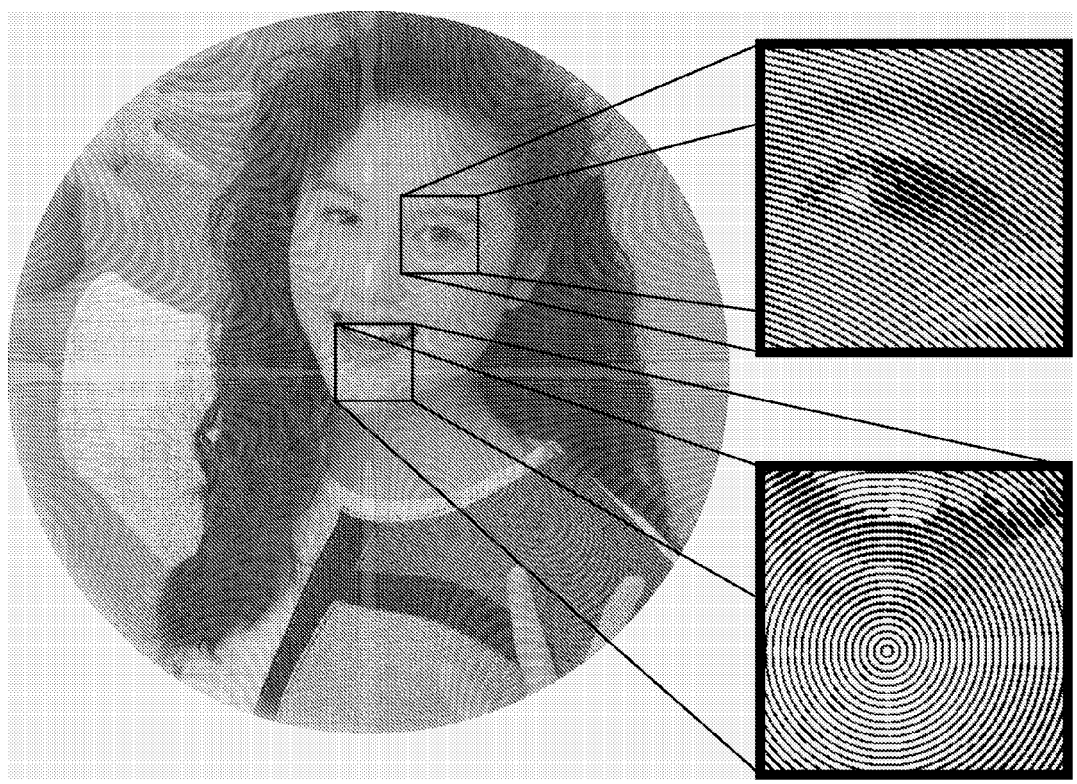
FIG. 16 shows two magnifications of a halftone image produced with a pattern exhibiting an invariant feature.

The pattern is designed so that the 1D profile of the pattern taken in any direction and with any scale, exhibits an invariant feature. This similar feature can then be used to trigger the detection, disregarding the geometrical transform which has been applied to the image. FIG. 12 shows an example of a pattern exhibiting an invariant feature: this pattern is composed of concentric circles. Any straight line crossing this pattern through its center will produce the same 1D profile. FIG. 16 shows a pattern exhibiting an invariant feature embedded into an image under the form of a halftone screen composed of concentric circles.

Figure 50:
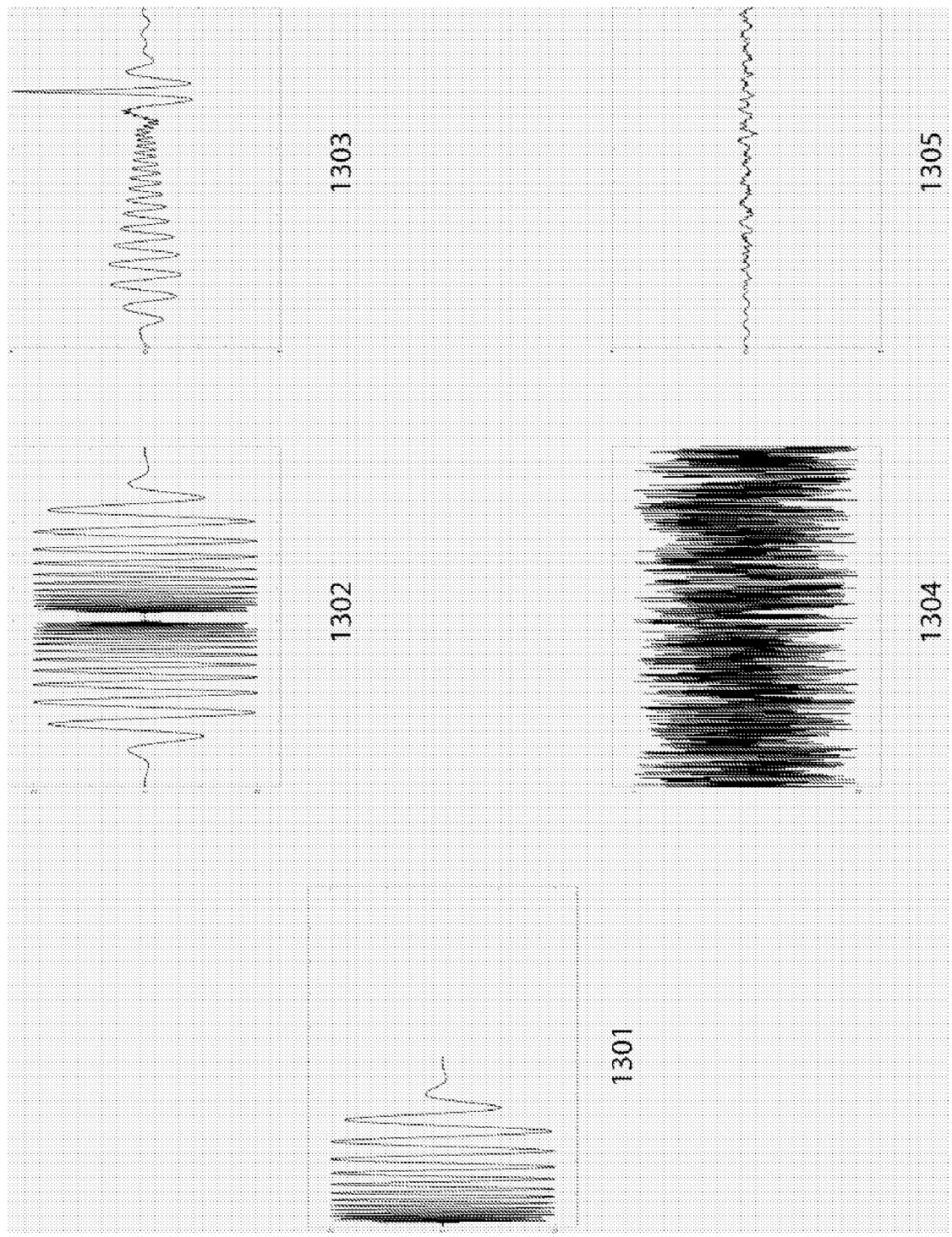
FIG. 50 shows the results of the normalized cross-correlations between a template and two signals.
Figure 51:
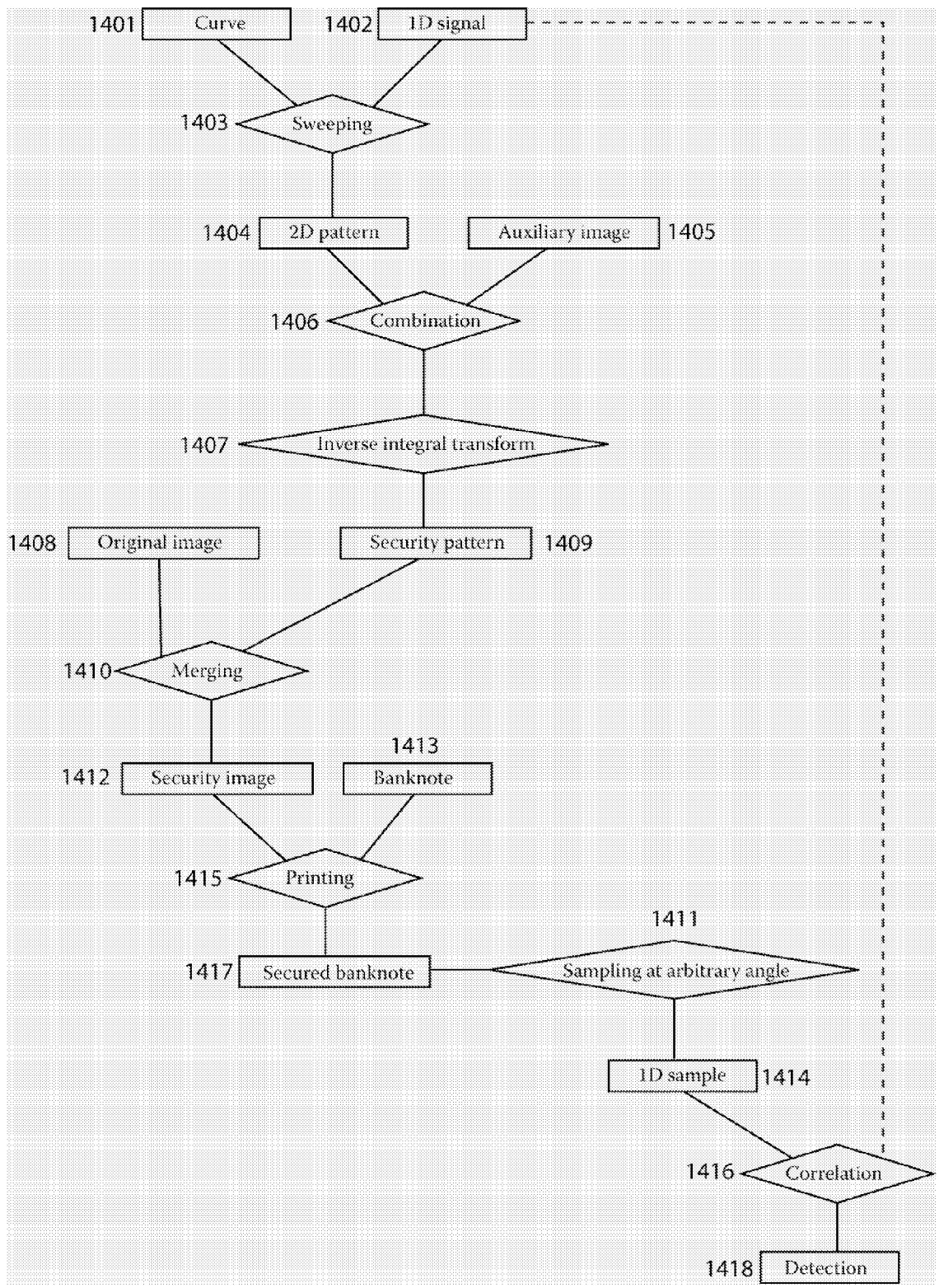
FIG. 51 shows a general diagram of the invention.

Invariance under rotation can also be obtained by embedding a circularly symmetric pattern in the Fourier domain. When an image is processed by a printing device or an acquisition device, image data is transferred through the device one line at a time. The detector applies a color transform to the individual image lines in order to transpose them into the color space where the security image is present. The sum S of the transformed lines is stored in a separate image buffer. This sum can be viewed as the projection of the image from a two-dimensional space onto a one-dimensional space. After a predefined number of lines have been summed, the detector calculates the one-dimensional Fourier transform FS of the sum S. The result of this Fourier transform is individually compared to a bank of predetermined one-dimensional signal templates stored in the device's ROM. These comparison operations belong to the class of matched filtering, and they are implemented with a cross-correlation (normalized cross-correlation, phase-only cross correlation, canonical cross-correlation). This process is illustrated in FIG. 50, which shows the result (1303) of a normalized cross-correlation between a scale-invariant template signal (1301) and a mirror copy of the same signal (1302). As a comparison, the result (1305) of a cross-correlation between the same template signal (1301) and white noise (1304) is shown. Before the comparison takes place, FS can undergo a series of pre-processing steps in order to increase the reliability of the cross-correlation. These steps include windowing (Hamming), pre-whitening, band-pass filtering, histogram equalization, envelope demodulation, denoising, windowed averaging. The result of the comparison between FS and the device's bank of one-dimensional signal templates is assessed with the help of one or more statistical tests. If the assessment yields a positive answer, the image is assumed to carry the security image and the device reacts accordingly by interrupting its function. This process may also be performed in several steps: a first step using a few lines to detect if the signal is present. If the signal is detected then additional lines are processed in order to confirm the detection (this approach enables to satisfy false-positive requirements and processing speed requirements). Data of successive lines may also be used to compute a signal in a rotated direction. This also contributes to reach a desired false-positive detection rate.

Figure 45:
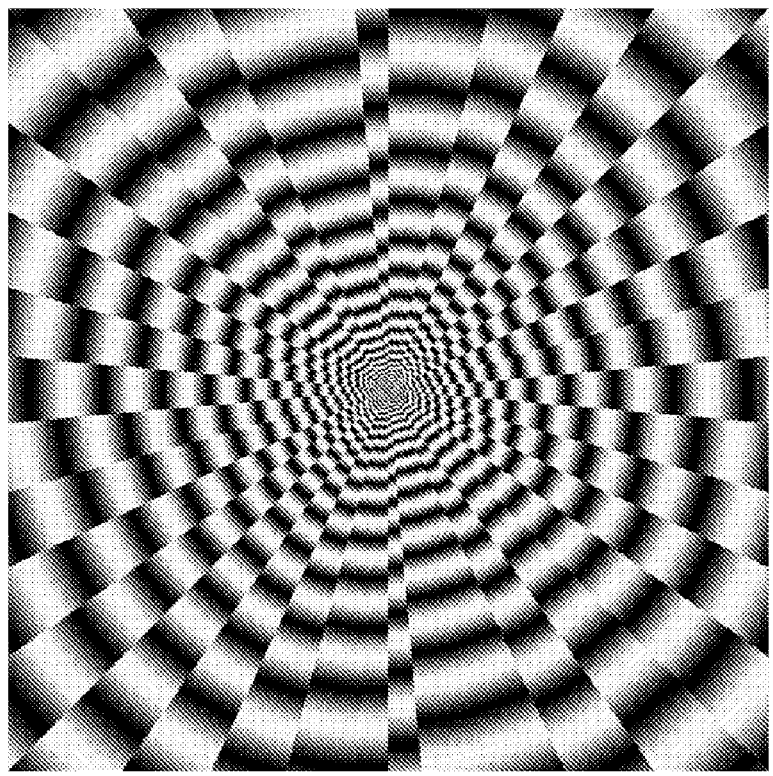
FIG. 45 shows a radially symmetric pattern with a coarse-grain random radial jitter.
Figure 46:
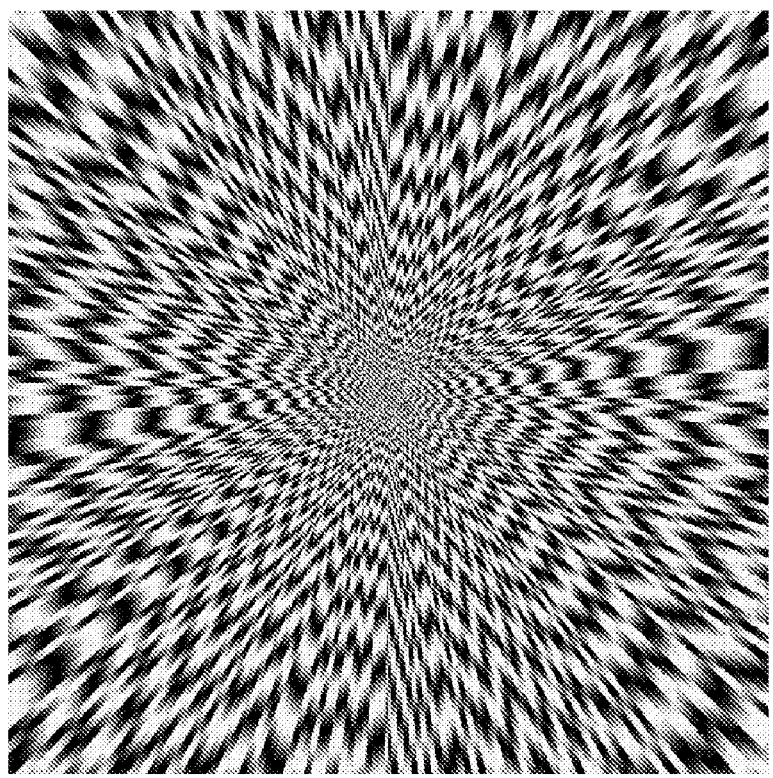
FIG. 46 shows a radially symmetric pattern with a fine-grain random radial jitter.
Figure 47:
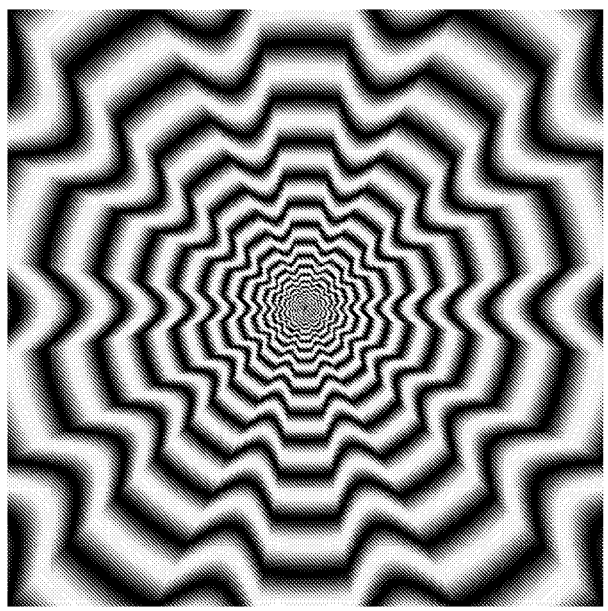
FIG. 47 shows a radially symmetric pattern generated with a function.

The condition of circular symmetry is necessary to guarantee a strict invariance under rotation, but such a strict invariance is not always needed in order to get a two-dimensional pattern that can be reliably detected in one dimension. Two-dimensional signals that observe the less strict requirement of radial symmetry can also be detected reliably in one dimension if they are based on a one-dimensional signal that is either autocorrelated, self-similar or scale-invariant (or has several of these properties). FIG. 45 shows such a radially symmetric pattern generated by subdividing a scale-invariant pattern (LRHF) in 36 sectors of 10 degrees of arc and by applying a random radial jitter to each sector. FIG. 46 shows another radially symmetric pattern generated by subdividing a scale-invariant pattern (LRHF) in 360 sectors of 1 degree of arc and by applying a random radial jitter to each sector. FIG. 47 shows a radially symmetric pattern generated with a function of the form:

$$F(R, \text{Theta}) = \cos(a * \log 2(R) + b * \max(0, \cos(k * \text{Theta})))$$

Figure 48:
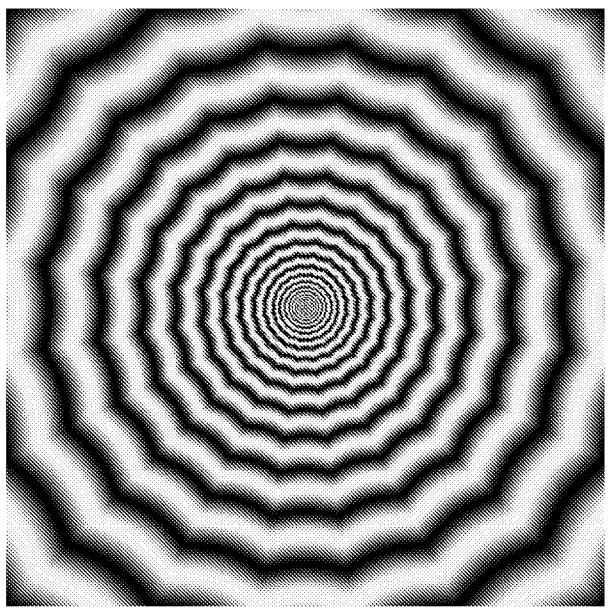
FIG. 48 shows another radially symmetric pattern generated with a function.

FIG. 48 shows another radially symmetric pattern generated with a function of the form:

$$F(R, \text{Theta}) = \cos(a * \log 2(R) + b * abs(\cos(k * \text{Theta})))$$

Figure 52:
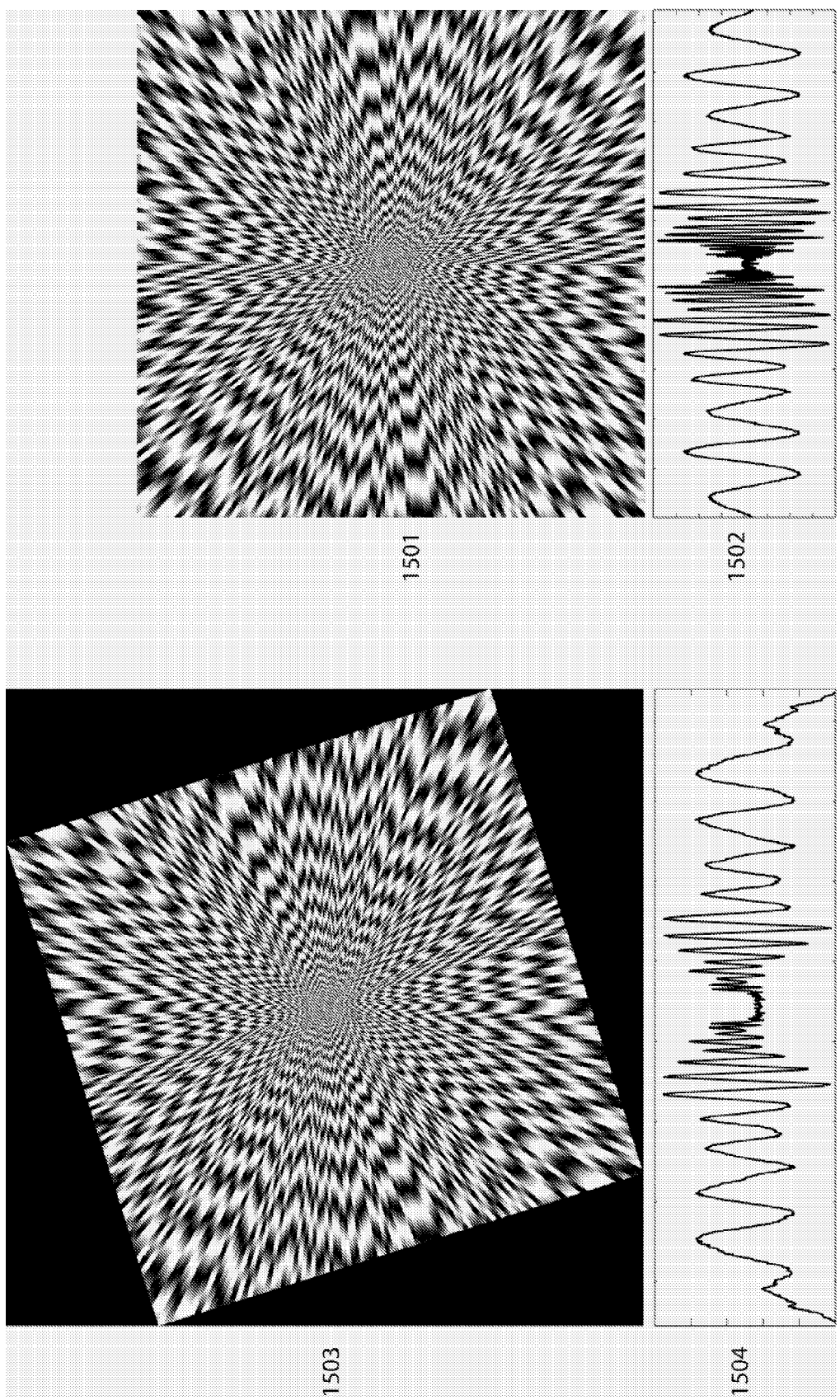
FIG. 52 shows the projections of a radially symmetric pattern before and after a rotation.

Because radially symmetric patterns above are based on a scale-invariant function, the sum of their lines will produce a one-dimensional signal with a shape that remains similar when the patterns are rotated. This property means that the cross-correlation between a one-dimensional signal template and the projection of such a radially symmetric pattern will produce a similar response regardless of the orientation of the pattern. FIG. 52 provides an illustration of this property.

Compensation Based Approach

Figure 18:
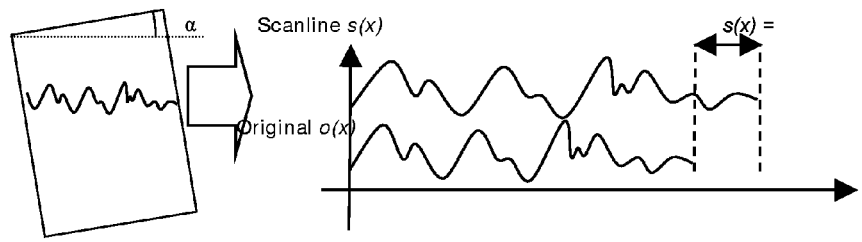
FIG. 18 shows the signals for the referenced signal and the signal after form a rotation of the image.

Compensation can be performed either by using a separate reference pattern (for instance a printed circular pattern enables to define the horizontal versus vertical scale alteration) or by a mathematical transform of the signal that maps it into another domain in which the compensation is performed more easily. For instance, a logarithmic transform enables to map the signal in a different space that allows for easy compensation of a scale alteration. This scaling can be caused for instance by a digitizing resolution that is different from the printing resolution of the signal. It may also be caused by a rotation of the digitized sample as shown in FIG. 18. The scaling factor is related to the angle of rotation a with the cosine function $Cos(\alpha)$.

Indeed, let $s(x)=f(\log(x))$

If the original signal $o(x)$ differs from $s(x)$ by a factor $\lambda$ (See FIG. 19), then:

$$s(x)=o(\lambda x)$$

Using the log transform gives:

$$s(Ln(x))=o(Ln(\lambda x))$$

Then it follows that:

$$s(t)=o(Ln(x)+Ln(\lambda))=o(t+\Delta t),$$

with $t=Ln(x)$ and $\lambda=\exp(\Delta t)$

Figure 19:
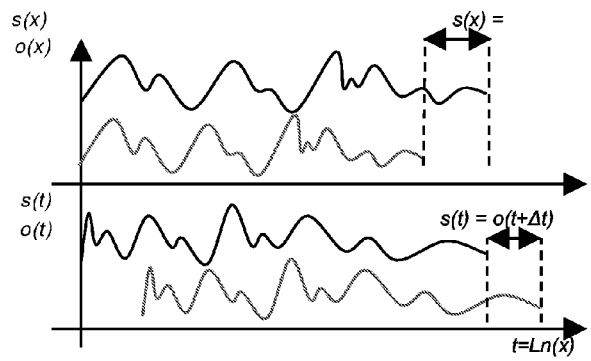
FIG. 19 shows the logarithm value of the signal stretched.

This equation means that the stretched signal $s(x)$ is equivalent to a translation when a log scale is used to define the sampling position as shown in FIG. 19. The value of this translation can be found by using the maximum value of the cross-correlation signal computed between the digitized signal $f(x)$ and the known original signal $o(x)$. It then enables to compute the scale factor using the equation:

$$and \; \lambda=\exp(\Delta t)$$

It is then possible to retrieve the angle $\alpha$ from $\lambda$ and compensate for the rotation by a rotation with reverse angle.

Preferred Embodiments for Pattern Detection

Figure 3:
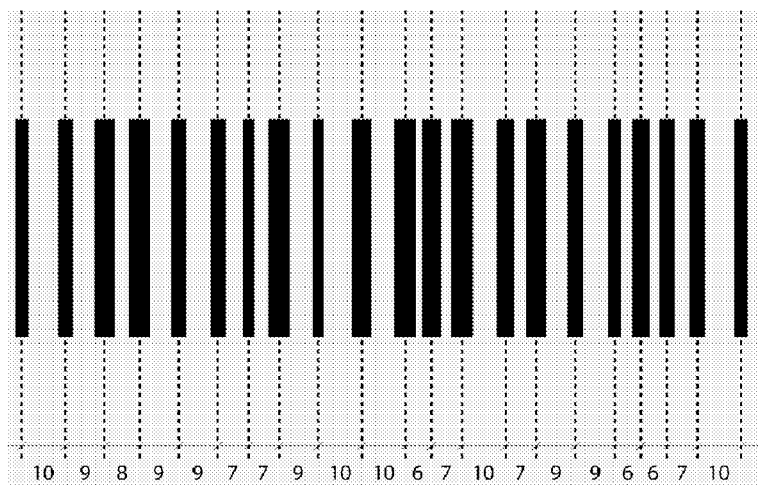
FIG. 3 shows an example of stripe spacing modulation.
Figure 4:
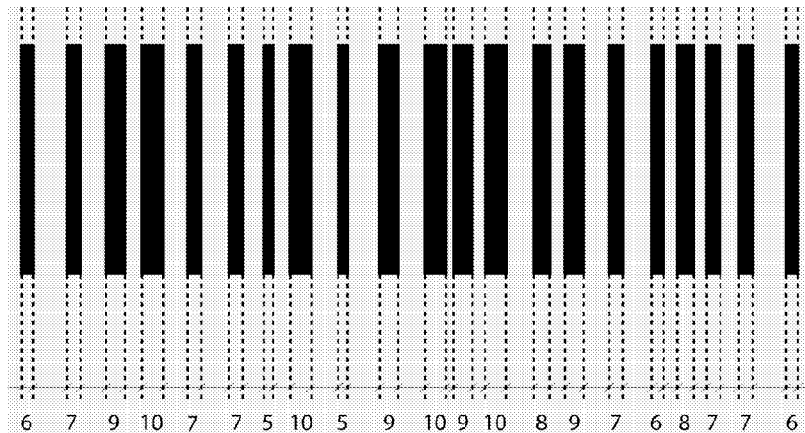
FIG. 4 shows an example of stripe width modulation.
Figure 5:
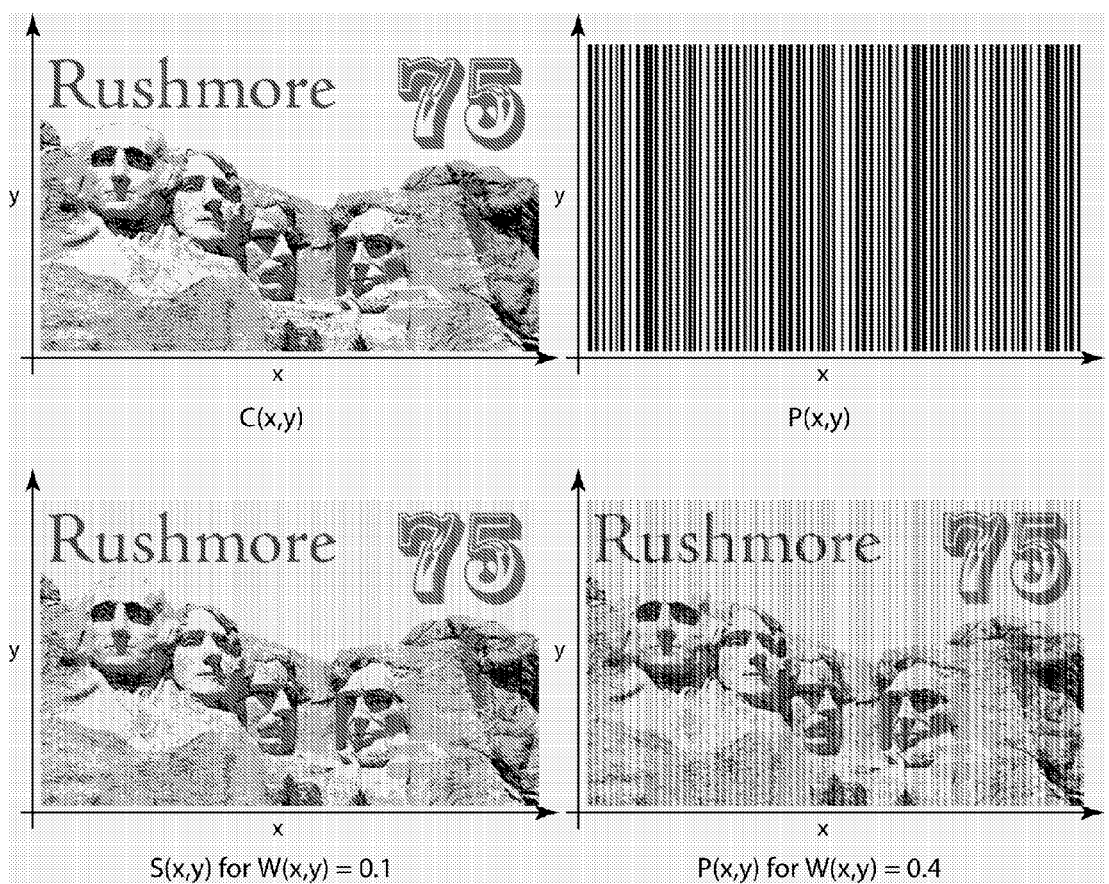
FIG. 5 shows the steps to a linear interpolation of an image.

The statistical test is performed in the simplest embodiment as a finite state machine which counts how many times the signal matches some predefined characteristics and compares it to a threshold. These characteristics can be a number of transitions of the signal, a sequence of width as shown in FIG. 4 or a sequence of spacing as shown in FIG. 3. The signal is then defined as a grayscale value. In another embodiment, the signal is a vector defined by several color components, for instance red-green-blue, cyan-magenta-yellow-black, hue-luminance-saturation, hue-saturation-value, CIE-Lab, CIE-Lch or CIE-XYZ (or in certain predefined range of light wavelength). This multi-color approach enables to increase the detection rate performances. In another embodiment the detected characteristics are defined by a quantum random number generator or a pseudo-random number generator with a key provided separately or computed from other features (visual or not) of the security document.

In another embodiment the statistical test is performed using signal processing algorithms (for instance but not limited to cross-correlation, invariant computation, etc). The result of this test is then compared to some pre-defined threshold or threshold computed from the processed data.

Figure 20:
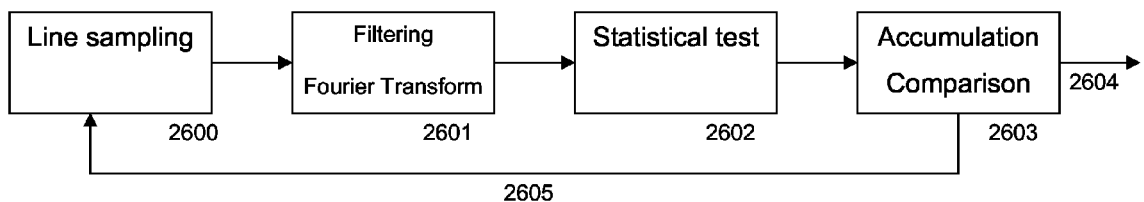
FIG. 20: A general iterative detection scheme for each line of the banknote.

The robustness to geometrical attacks can be performed in one embodiment by the mean of an invariant feature, including but not limited to, circular patterns. In another embodiment, the robustness is obtained using a compensation method. In one embodiment this method uses the above described Log transform combined with some cross-correlation (or other matching indicator) technique. The general detection scheme is shown in FIG. 20: In 2600, colors of the banknote are digitally sampled along a straight line across the banknote (and titled with an arbitrary angle) and stored as a 1D signal. In 2601, a filtering may be performed in order to enhance some particular properties. In 2602, a statistical test is then performed. This test can be based for instance on the cross-correlation with a 1D signal, or an autocorrelation, a measurement of auto-similarities, etc. Such measurements are generically named "correlation" throughout this document. In 2603, this values corresponding to this measurement is accumulated with values computed for previous lines and compared to one or several thresholds. If the accumulated values exceed some threshold, a positive detection signal is sent in 2604. In case of no positive detection, the system acquires a new line of the banknote in 2605. The detection of the security image may also use one-dimensional signal processing based on Fourier transform. Its theoretical basis lies on a result from the field of tomographic reconstruction, the projection-slice theorem. This theorem states that the Fourier transform of the projection of a two-dimensional function onto a line is equal to a slice through the origin of the two-dimensional Fourier transform of that function which is parallel to the projection line. The corresponding detection scheme is still shown in FIG. 20 with the addition of a Fourier transform in 2601.

Preferred Embodiments for Pattern Creation

Figure 1:
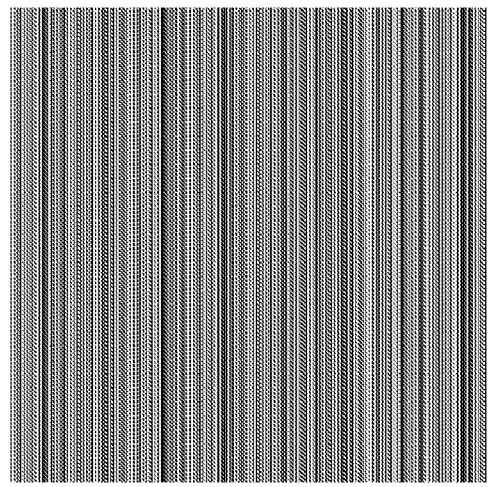
FIG. 1 shows a linear grating of alternating stripes.
Figure 2:
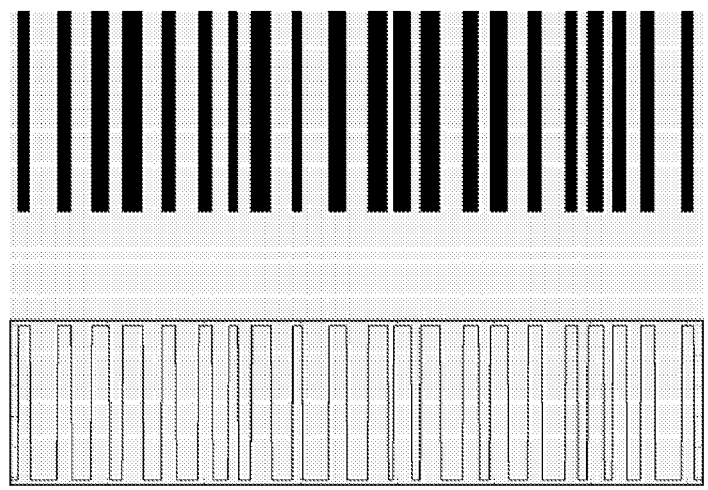
FIG. 2 shows a grating including a square-pulse signal.

In its simplest embodiment, the security pattern that is applied by the first method takes the form of a linear grating of alternating dark and light stripes (FIG. 1). This grating incorporates a square-pulse signal (FIG. 2) which is carried by the modulation of the distance between the centers of the stripes (FIG. 3) or by the modulation of the width of the stripes (FIG. 4).

The security document is obtained by embedding the security pattern into the original image by the means of a linear interpolation. If $C(x,y)$ is the value of the original image at the position $(x,y)$, $P(x,y)$ is the value of the pattern at the position $(x,y)$ and $W(x,y)$ is the desired weight of the pattern at the position $(x,y)$, then the value $S(x,y)$ of the security document at the position $(x,y)$ is calculated with:

$$S(x,y)=(1-W(x,y))*C(x,y)+W(x,y)*P(x,y)$$

By the appropriate choice of $W(x,y)$, it is possible to continuously vary the visibility of the pattern from totally invisible to totally visible.

Figure 6:
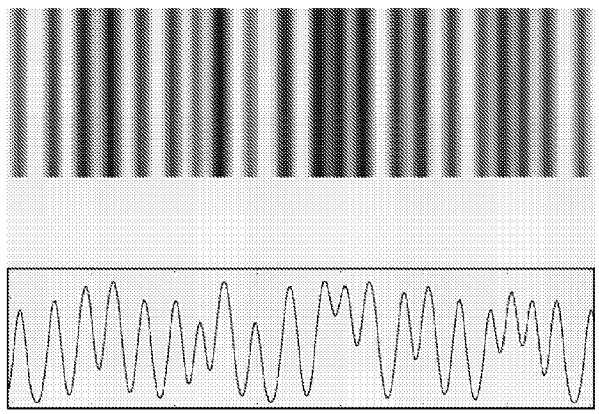
FIG. 6 shows a first example in which the stripes varies continuously along their width.
Figure 7:
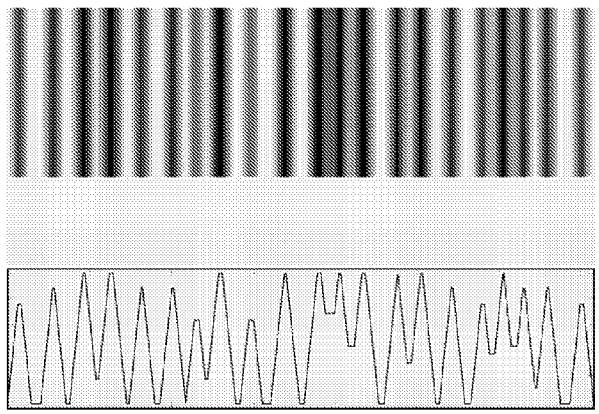
FIG. 7 shows another example type of stripe's modulation.
Figure 8:
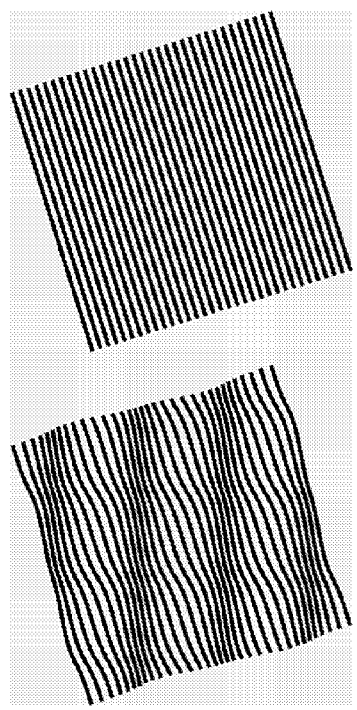
FIG. 8 to FIG. 11 show various example of stripes modulation.
Figure 9:
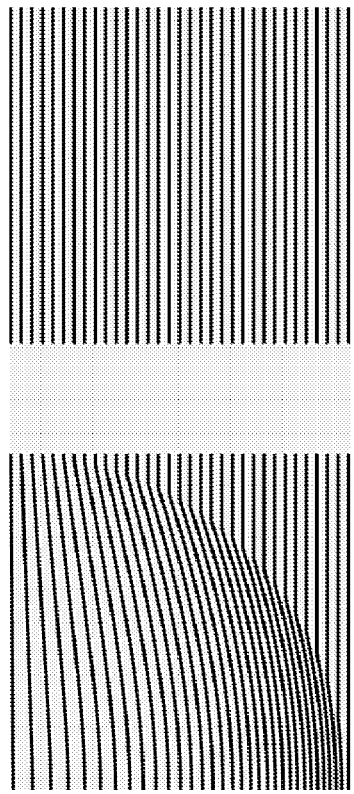
Figure 10:
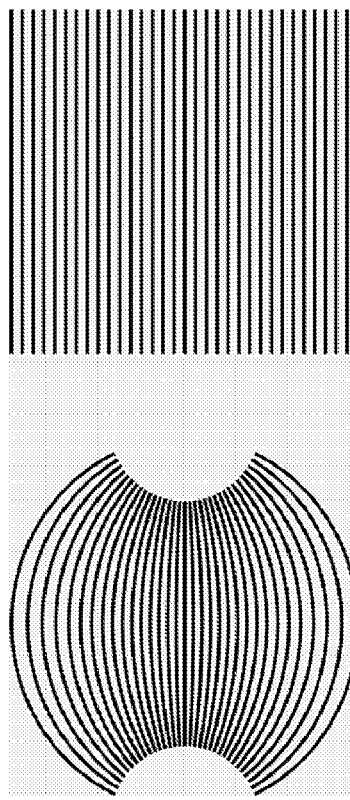
Figure 11:
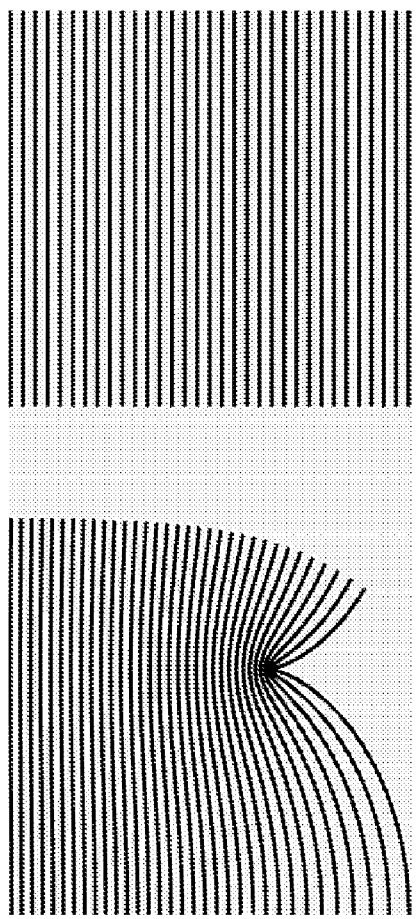

In a second embodiment of the invention, the value of the stripes varies continuously along their width. With this variation, the shape of the signal carried by the security pattern takes the form of a continuous function like a sine wave (FIG. 6) or a triangle pulse (FIG. 7).

In a third embodiment of the invention, the pattern undergoes a geometrical transform under the form of a conformal mapping (FIG. 8, FIG. 9, FIG. 10, FIG. 11). A particular case of a geometrical transform produces a pattern formed of concentric circles (FIG. 12). Such a pattern exhibits an invariant feature: the same signal can be detected across all the straight lines crossing the pattern through its center, regardless of their orientation. Such an invariant feature enables the detection approach based on an invariant signal.

Someone skilled in the art will also be able to realize above embodiments with any pattern obtained by sweeping a constant or varying signal.

In a fourth embodiment of the invention illustrated in the FIG. 13, the original image is divided in several separate areas and the security document is obtained by embedding a different security pattern in each area.

In a fifth embodiment of the invention, the security document is obtained by separately embedding a different security pattern into in each color component of the original color image (FIG. 14). (RGB images embedded in the B component, CIE-Lab images embedded in the L component, CMYK images embedded in the Y component, etc.)

In a sixth embodiment of this invention, the security document is obtained by transforming the color space of the original image before embedding the pattern into a subset of the transformed color components. (RGB->HLS, embedding in the H component; RGB->CIE-Lch, embedding in the c component; etc.)

In a seventh embodiment, the security pattern is embedded in the security document by modifying only the chrominance components of the original image. The original luminance component is left unmodified, and the difference between the original chrominance components and the modified chrominance components is maintained below the perceptual threshold.

Figure 15:
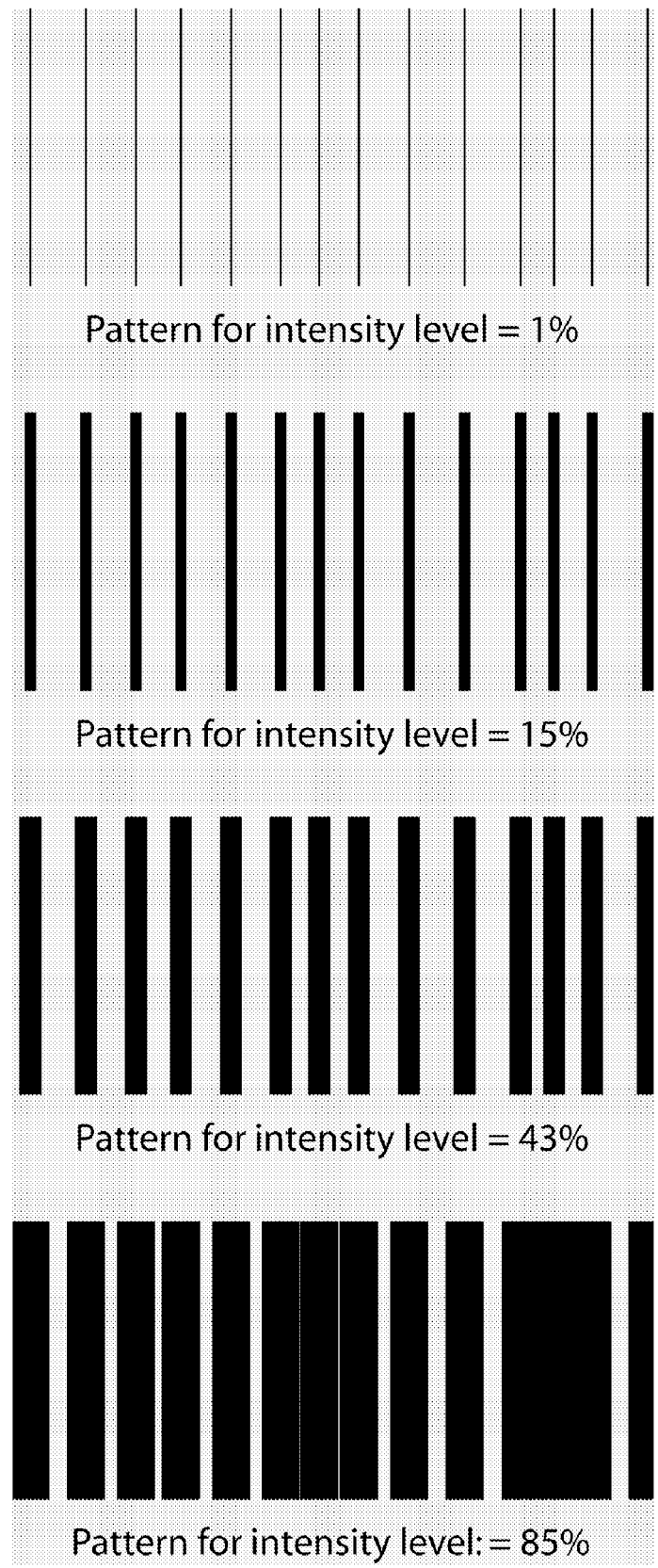
FIG. 15 shows various pattern intensities.

In an eight embodiment, one security pattern is generated for every luminance level present in the original image. The thickness of the lines of these patterns varies accordingly to the luminance level they are associated to, but the position of these lines remains constant across each one of the patterns (FIG. 15). The security document is then obtained from these security patterns by embedding them under the form of a halftone screen (FIG. 16). Using a circular pattern (like the example shown in FIG. 16) enables to obtain a signal that is invariant to rotation.

In a ninth embodiment, the security pattern is totally visible ($W(x,y)=1$ in the previous equation for $(x,y)$ belonging to marked area) on selected areas of the document.

In a tenth embodiment, the security pattern is an invariant signal which is defined in the Fourier domain. A security image layer is built from the security pattern by the means of an inverse Fourier transform.

1. Security image layers all have these common properties:
   1.1. Layer is printed onto a banknote.
   1.2. Layer is bi-level (ink/no ink).
   1.3. Layer is generated by applying a dither matrix to a grayscale image in order to obtain a halftone.
      1.3.1. Layer produces a visible pattern in frequency domain with a circular symmetry or a central symmetry. Pattern is built by applying a 360-degree circular sweep to a one-dimensional signal. This one-dimensional signal has at least one of the three following properties:
         1.3.1.1. one-dimensional signal is self-similar across a given range of scale factors (e.g. a fractal signal).
         1.3.1.2. one-dimensional signal is auto-correlated across a given range of scale factors (e.g. a Cryptoglyph).
         1.3.1.3. one-dimensional signal is invariant across a given range of scale factors (e.g. a log-harmonic function).

Basically any two-dimensional function f depending on the radius r and the angle theta is possible as long as $f(r,theta)=f(r,theta+pi)$ and $f(r)$ is self-similar, auto-correlated or scale invariant.

When the signal is invariant across a given range of scale factors (typically for a log constructed signal), it is possible to shift arbitrarily (for instance using a quantum random number generator or a pseudo-random number generator) the signal along the radius for different angles. Let us consider the particular case of the function below:

$$f(r,\theta)=\cos(a \ln(r)+k\theta+\phi)$$

In this equation, k and a are two fixed parameters. Then, $\phi$ is the shift of the signal.

Figure 44:
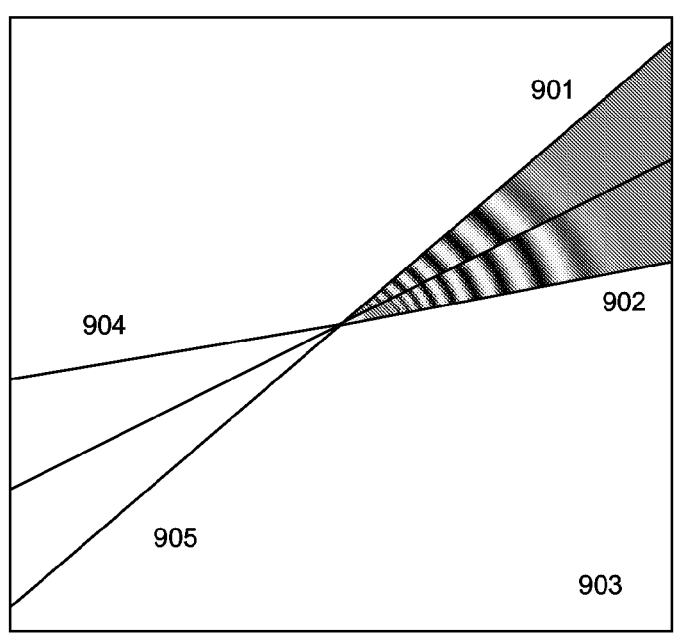
FIG. 44 shows the building of a security image layer by the shifting of the security pattern.

FIG. 44 illustrates this process in the Fourier space 903. The periodic signal in sector 901 and 902 only differ by their phase. The sectors 904 and 905 are symmetric versions of respectively sectors 902 and 901. In these cases, the phase $\phi$ is actually a function of the angle theta and of the radius r. The approach enables to better conceal the signal in the Fourier domain and thus making it more difficult for an attacker to detect and remove it. It also enables to strengthen the signal for some sets of angle and radius values, which may be useful to increase the detectability of the signal (for instance if the banknote artwork frequencies interfere with the signal in the Fourier domain or to enhance the detectability at 0 and 90 degrees in the Fourier domain). Other examples are shown in FIG. 45, FIG. 46, FIG. 47 and FIG. 48 with different $\phi$ functions (where $\phi$ is a random function in FIG. 45 and FIG. 46).

2. Dither matrices are created with the use of one or more spot functions.
3. A first class of spot functions is based on a pair of 2D matrices. The first matrix (A) contains a visible pattern according to 1.3.1; the second matrix (B) contains additive white noise (but any other type of noise can also be used) in the range [-pi, pi] in order to obtain a rather uniform image in the spatial domain. These two matrices are converted to a single matrix of complex numbers (C), with $C(x,y)=A(x,y)*\exp(i*B(x,y))$. C is then made symmetrical (FFT sense), so that its inverse Fourier transform is a real image. The spot function used for generating the security image is obtained by calculating the inverse Fourier transform of C. It is also possible to use an centrally asymmetrical C matrix. In this case, the inverse Fourier transform is a complex image. Real and imaginary parts can be printed with different colors, so that the detector can recover the complex image. Not only colors can be used in order to aid the decoder to distinguish between the real and imaginary parts. It possible to use any optical property which provides two independent channels for the real and imaginary parts. For instance, the top half portion of a banknote area may encode the real part while the bottom part will encode the imaginary part. Any other spatial criteria known by the decoder may be used to differentiate areas dedicated to real and imaginary parts (like real part always encoded in circular areas or borders of the banknote, etc. . . . ). Another way to construct the security image defined as $A(x,y)*\exp(i*B(x,y))$ is to use a matrix $A(x,y)$ with one of the above method and a phase matrix $B(x,y)$ which coefficients are not all randomly chosen (the FIG. 35 illustrates the way the security image is designed for the particular case of a totally random phase matrix 1202). In this case, we have:

$$B(x,y)=r(x,y) \text{ for } (x,y) \text{ belonging to } S1$$

$$B(x,y)=f(x,y) \text{ for } (x,y) \text{ belonging to } S2$$

Where $r(x,y)$ is a quantum random number or a pseudo-random number between [-pi,pi] and $f(x,y)$ is an arbitrary function with values between [-pi,pi], S1 and S2 are two sets of (x,y) indexes such that $S1 \cup S2$ is the whole image.

For instance, low frequencies may be random while high frequencies may be fixed with a constant value. In this case, the corresponding inverse Fourier transform of $A(x,y)*$ exp(i*B(x,y)) will not be a uniform noise. One interest of this approach is to create a decorative pattern in the spatial domain.

4. A second class of spot functions is obtained by combining a spot function F1 of the first class (3) and a spot function F2 describing a regular amplitude-modulation screen. This combination is performed in the frequency domain. The module A2 and the phase B2 of the Fourier transform of F2 are calculated. A first matrix A1 is then generated with a visible pattern according to 1. The position of the N largest peaks in the matrix A2 is then recorded, and a circular region centered around the corresponding positions in A1 is set to zero. A third matrix A3 is calculated as a combination of the two matrices A1 and A2. This combination can take the form of an addition (A3=A1+A2), a multiplication (A3=A1*A2), a linear interpolation (A3=(1−s)*A1+s*A2, with s in ]0, 1[), etc. The two matrices A3 and B2 are converted to a single matrix of complex numbers (C), with $C(x,y)=A3(x,y)*exp(i*F2(x,y))$. C is then made symmetrical (FFT sense). The spot function used for generating the security image is obtained by calculating the inverse Fourier transform of C.

5. A third class of spot functions is based on some spot function F1 of the first class (3). The dither matrix derived from F1 is applied to a grayscale image with a constant intensity level. The result of this operation is a bi-level halftone image B. A set of morphological operations are applied to B in order to obtain a set $\{H_1, H_2, \ldots H_n\}$ of n bi-level halftones. These morphological operations may include erosion, dilation, skeletonization, outline, pruning, among others. The ratio of black pixels $\{k_1, k_2, \ldots k_n\}$ is calculated for each one of the halftones $\{H_1, H_2 \ldots H_n\}$. These ratios of black pixels $\{k_1 \ldots k_n\}$ are associated to the corresponding halftones. The set of halftones is then ordered according to these ratios. The individual halftones are merged together in to order form the spot function F used for generating the security image. This merging is done by traversing all the pixels F(x,y) of F. For each pixel, the values $\{H_1(x,y), H_2(x,y), \ldots H_n(x,y)\}$ of the corresponding pixel in $\{H_1, H_2 \ldots H_n\}$ are retrieved. The highest value $\max_k(H_k(x,y))$ is assigned to F(x,y). taking the highest value 6. A fourth class of spot functions are directly derived from some of the patterns described in 1.4. If the distribution of the 1D signal used to build a pattern is balanced enough, i.e. the set of values taken by the 1D signal is evenly distributed, (it takes a "large enough" set of values) then it may be used directly as a spot function. This is particularly interesting for LRHFs. Indeed, since the Fourier transform of a LRHF is also a LRHF, the same detector may be used.

Figure 43:
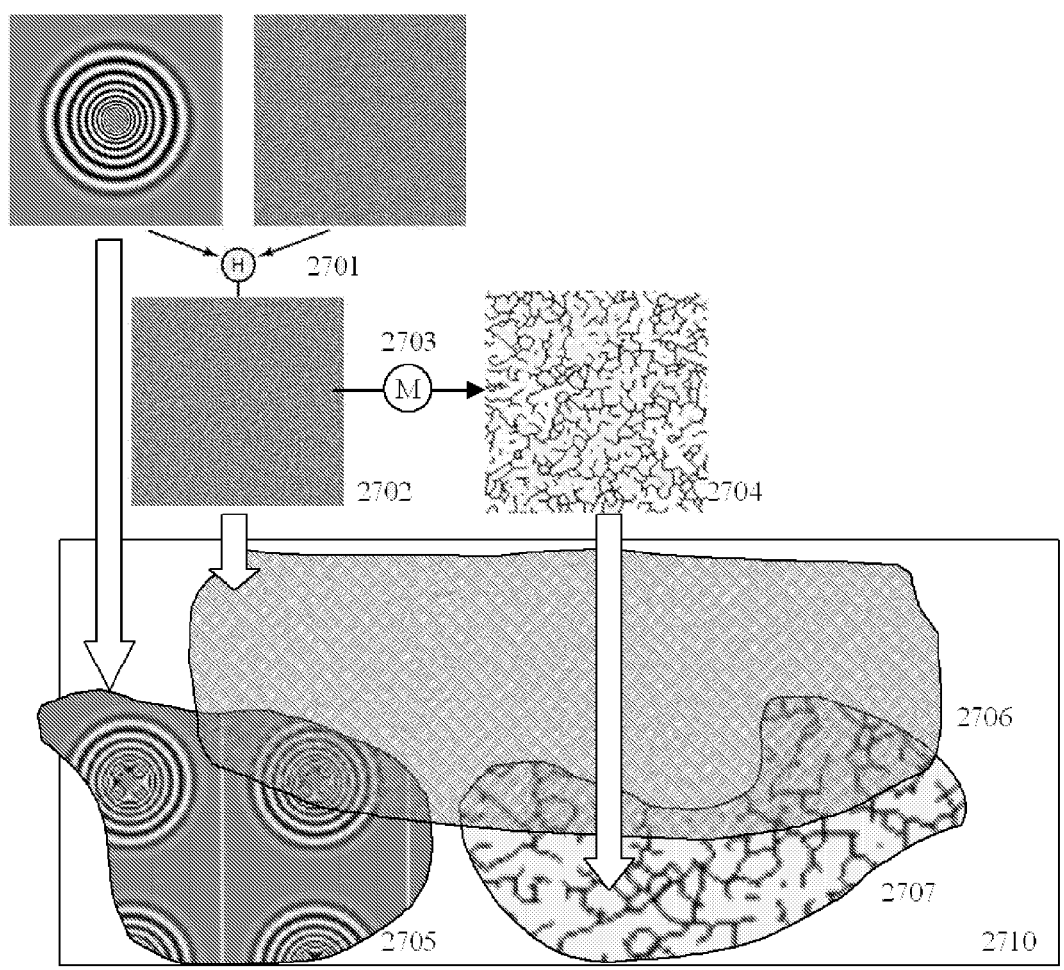
FIG. 43 shows how patterns can be combined in the same banknote.

7. This particular property enables to combine in the spatial domain two kind of signals in distinct (or even overlapping) areas:
    areas featuring security patterns defined by the inverse Fourier transform of matrix C
    areas featuring a security pattern defined by C itself
This combination of signal enables for instance to use the security pattern as an overt decorative image in some areas (because of its circular symmetries and invariance properties, the matrix C has some aesthetic properties as can be seen on FIG. 41 and FIG. 42), or as a covert invisible security in other areas. This approach can be better understood with FIG. 43. A banknote 2710 features different areas 2705, 2706, 2707 with arbitrary size and location which are partly overlapping (overlap may be obtained by overprint or by digital combination). Each of these areas is filled with a security pattern which is obtained by one of the above methods: the area 2705 is obtained by tiling a circular log invariant function, the area 2706 is obtained by tiling the inverse Fourier transform of this circular function, the area 2707 is obtained by tiling the skeletonized and thresholded version of this inverse Fourier transform. Each individual pattern will contribute in the Fourier space (modulus image) to increase the signal to noise ratio of the circular signal. This approach can be easily generalized with other integral transform than Fourier.

8. A fifth class of spot functions are built by combining spot functions of the four other classes with operations such as addition, subtraction, multiplication, exclusive-or, addition modulo n.

In another embodiment, the security image $C(x,y)=A(x,y)*exp(i*B(x,y))$ defined above in the Fourier domain with a rotating 1D function for A(x,y) and a quantum random signal or a pseudo-random signal for B(x,y) is directly printed as an overlay on the banknote to be protected. For instance, a banknote is first printed with 4 different ink colors. The security image (see image 1203 in FIG. 35) layer is afterward overlaid with a separate color all over the already printed banknote. This color should be chosen in order to obtain the best compromise between invisibility and detectability of the signal. For instance, a light gray color may be an appropriate choice for a banknote featuring little or no graphic (like in the water mark area). A darker ink may be required in other cases. Ideally, the color of the security image should be chosen among the already used set of colors (4 in our example) in order to minimize the number of offset plates.

The main problem that arises when overlaying over a non uniform area like a banknote is to obtain areas where the security image is either too visible (thus degrading the visual appearance of the banknote) or not enough visible (thus not reliably detectable). One solution is to locally increase or decrease the intensity of the security image based on a weighting function W(x,y) as shown in the first embodiment. Another solution consists in adjusting the transparency of the ink used for producing the signal overlay: a transparent ink will produce a faintly visible signal on all but the lightest backgrounds, while an opaque ink will produce a strongly visible signal on most backgrounds. In another embodiment, the security pattern is obtained by combining the fourth and ninth embodiment: a banknote includes some areas with a grating and other areas filled with an invariant signal.

Figure 49:
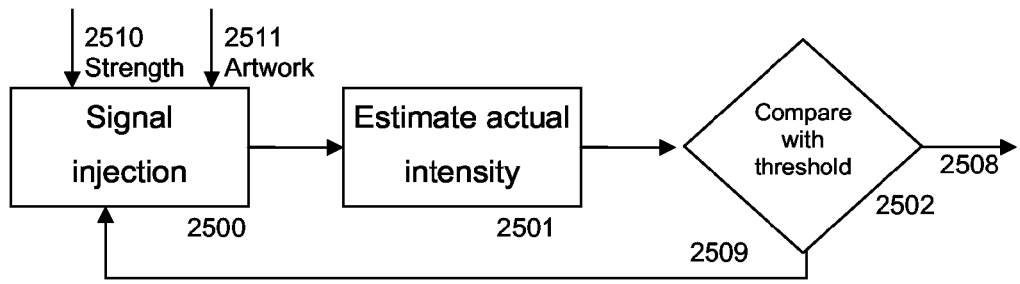
FIG. 49 illustrate an interactive or automatic process for signal integration into the design art work.

The integration of the signal into the design layout of the banknote can be performed as illustrated in FIG. 49: In 2500, the signal is digitally injected into the artwork 2511 (either by modifying the dither matrices or by digital overlay) of the banknote with a strength 2510. In 2501, an estimate of the signal intensity is computed. This estimate is a prediction of what will be the signal intensity after printing and scanning and is compared to some predefined threshold in 2502 (this threshold can be the minimum number of lines required for a positive detection). If intensity is not sufficient, then strength 2510 is increased and the process repeats. The whole process may be entirely automatic (the system automatically adjusts to the minimum strength required for positive detection) or interactive (the designer can then evaluate the visual impact of a given strength on the design and on the detectability). This adjustment process may be non-iterative if it is possible to predict exactly the strength required for a given artwork 2511.

The invention claimed is:

1. A method for generating a printed security image on a banknote, said security image comprising an original image and a security pattern, the method comprising the steps of:
    obtaining said security pattern, wherein said security pattern in the spatial domain is the inverse Fourier transform of the combination in the frequency domain between the Fourier transform of an auxiliary image and a radially symmetric, two-dimensional pattern, said two-dimensional pattern created by sweeping a self-similar, one-dimensional function along a 360-degree arc, said security pattern being detectable from the maximum value of the cross-correlation of said one-dimensional function with the Fourier transform of one line of said banknote, said line being sampled along any arbitrary direction and with any resolution between 50 and 1200 dots per inch;

generating the security image in the spatial domain by merging at least one color of at least a part of the original image with the security pattern.

2. The method as defined in claim 1, wherein the merging of the original image with the security pattern for generating the security image is performed by thresholding a grayscale image with a spot function, the module of the Fourier transform of said spot function containing a two-dimensional radially symmetric pattern.

3. The method of claim 2, wherein the spot function is constructed as the inverse Fourier transform of a module and a phase, said module being a radially symmetric pattern, and said phase being white noise.

4. The method of claim 2, wherein the spot function is constructed as the inverse Fourier transform of a module and a phase, said module constructed as a linear interpolation between a pair of two dimensional patterns, the first pattern being the circularly symmetric pattern constructed by sweeping the self-similar one-dimensional signal along the 360-degree arc and the second pattern being the module of the Fourier transform of an arbitrary spot function, and said phase being the phase of the Fourier transform of said arbitrary spot function.

5. The method of claim 2, wherein the module of the Fourier transform of the spot function contains a two-dimensional radially symmetric pattern constructed by sweeping an auto-correlated one-dimensional signal along a radially symmetric curve.

6. The method of claim 2, wherein the module of the Fourier transform of the spot function contains, a two-dimensional radially symmetric pattern constructed by sweeping a scale-invariant one-dimensional signal along a radially symmetric curve.

7. The method of claim 1, wherein the two-dimensional radially symmetric pattern is also circularly symmetric and constructed by sweeping a one-dimensional signal along a 360 degree arc.

8. The method of claim 7, wherein the two-dimensional circularly symmetric pattern is constructed by sweeping an auto-correlated one-dimensional signal along a 360 degree arc.

9. The method of claim 7, wherein the two-dimensional circularly symmetric pattern is constructed by sweeping a scale-invariant one-dimensional signal along a 360 degree arc.

10. The method of claim 1, wherein the module of the Fourier transform of the security image contains a two-dimensional radially symmetric pattern constructed by sweeping an auto-correlated one-dimensional signal along a radially symmetric curve.

11. The method of claim 1, wherein the module of the Fourier transform of the security image contains a two-dimensional radially symmetric pattern constructed by sweeping a scale-invariant one-dimensional signal along a radially symmetric curve.

12. The method as defined in claim 1, wherein the security image is concealed.

13. The method as defined in claim 1, wherein the security image fulfils a decorative function.

14. The method as defined in claim 1, wherein multiple security images produced with different sweeping curves are used.

15. The method as defined in claim 1, wherein multiple security images produced with different one-dimensional signals are used.

16. The method as defined in claim 1, wherein multiple security images produced with different merging techniques are used.

17. The method as defined in claim 1, wherein the merging technique is an overlay of the security image on the original image.

18. The methods as defined in claim 17, wherein the overlay of two images is performed by printing the first image onto the second.

19. The method as defined in claim 1, wherein the merging technique is an overlay of the original image on the security image.

20. The method as defined in claim 1, wherein the security pattern can also be identified by combining successive lines.

21. The method as defined in claim 1, wherein the detection is performed by combining successive lines.

22. A method for generating a printed security image on a banknote, said security image comprising an original image and a security pattern, the method comprising the steps of:

obtaining said security pattern, wherein said security pattern in the spatial domain is an inverse integral transform of the combination in the frequency domain between an integral transform of an auxiliary image and a radially symmetric, two-dimensional pattern, said two-dimensional pattern created by sweeping a self-similar, one-dimensional function along a 360-degree arc, said security pattern being detectable from the maximum value of the cross-correlation of said one-dimensional function with the integral transform of one line of said banknote, said line being sampled along any arbitrary direction and with any resolution between 50 and 1200 dots per inch;

generating the security image in the spatial domain by merging at least one color of at least a part of the original image with the security pattern.

* * * * *